United States Patent
Abeywardena et al.

(10) Patent No.: US 12,492,019 B2
(45) Date of Patent: Dec. 9, 2025

(54) PROCESSES FOR GENERATING AND UPDATING FLYABLE AIRSPACE FOR UNMANNED AERIAL VEHICLES

(71) Applicant: Wing Aviation LLC, Mountain View, CA (US)

(72) Inventors: Dinuka Abeywardena, Mountain View, CA (US); Konstantin Bozhkov, Santa Clara, CA (US); Kyle Kakligian, San Francisco, CA (US); Stephen Lacy, Mountain View, CA (US); Scott Barron, Oakland, CA (US); Brandon Jones, Redwood City, CA (US); Aditya Undurti, Dublin, CA (US); Kyle David Julian, Mountain View, CA (US); Sai Bhargav Yalamanchi, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 255 days.

(21) Appl. No.: 18/047,895

(22) Filed: Oct. 19, 2022

(65) Prior Publication Data
US 2023/0122535 A1 Apr. 20, 2023

Related U.S. Application Data

(60) Provisional application No. 63/262,746, filed on Oct. 19, 2021.

(51) Int. Cl.
*B64U 10/13* (2023.01)
*B64U 10/20* (2023.01)
(Continued)

(52) U.S. Cl.
CPC ............ *B64U 10/13* (2023.01); *B64U 10/20* (2023.01); *B64U 10/25* (2023.01); *B64U 30/10* (2023.01);
(Continued)

(58) Field of Classification Search
CPC ................. G05D 1/042; B64C 39/024; B64U 2201/104; B64U 2101/32; B64U 2101/64;
(Continued)

(56) References Cited

U.S. PATENT DOCUMENTS

2016/0335898 A1* 11/2016 Caplan ................... G08G 5/53
2017/0248969 A1* 8/2017 Ham ....................... G08G 5/34
(Continued)

OTHER PUBLICATIONS

Dryanovski et al., "Multi-Volume Occupancy Grids: an Efficient Probabilistic 3D Mapping Model for Micro Aerial Vehicles," The 2010 IEEE/RSJ International Conference on Intelligent Robots and Systems, Oct. 18-22, 2010, Taipei, Taiwan, pp. 1553-1559.
(Continued)

*Primary Examiner* — Tyler D Paige
(74) *Attorney, Agent, or Firm* — McDonnell Boehnen Hulbert & Berghoff LLP

(57) ABSTRACT

A method includes receiving a digital surface model of an area for unmanned aerial vehicle (UAV) navigation. The digital surface model represents an environmental surface in the area. The method includes determining, for each grid cell of a plurality of grid cells in the area, a confidence value of an altitude of the environmental surface at the grid cell and determining a terrain clearance value based at least on the confidence value of the altitude of the environmental surface at the grid cell. The method includes determining a route for a UAV through the area such that the altitude of the UAV is above the altitude of the environmental surface at each grid cell of a sequence of grid cells of the route by at least the terrain clearance value determined for the grid cell. The
(Continued)

method includes causing the UAV to navigate through the area using the determined route.

23 Claims, 13 Drawing Sheets

(51) Int. Cl.
- *B64U 10/25* (2023.01)
- *B64U 30/10* (2023.01)
- *B64U 30/20* (2023.01)
- *B64U 30/26* (2023.01)
- *B64U 50/13* (2023.01)
- *B64U 60/10* (2023.01)
- *G05D 1/00* (2006.01)

(52) U.S. Cl.
CPC ............ *B64U 30/20* (2023.01); *B64U 30/26* (2023.01); *B64U 50/13* (2023.01); *B64U 60/10* (2023.01); *G05D 1/042* (2013.01); *B64U 2201/104* (2023.01)

(58) Field of Classification Search
CPC ............ B64U 2101/67; B64U 2201/10; B64U 10/20; B64U 10/25; B64U 30/10; B64U 30/20; B64U 30/26; B64U 50/13; B64U 60/10; B64U 10/13; G08G 5/0021; G08G 5/0039; G08G 5/0052; G08G 5/0069; G08G 5/0086; G08G 5/045

USPC .......................................................... 701/10
See application file for complete search history.

(56) References Cited

U.S. PATENT DOCUMENTS

| | | | |
|---|---|---|---|
| 2018/0204469 A1* | 7/2018 | Moster | G08G 5/34 |
| 2020/0026720 A1* | 1/2020 | Liu | G05D 1/101 |
| 2020/0202616 A1* | 6/2020 | Yu | G06T 17/05 |
| 2020/0258400 A1* | 8/2020 | Yuan | G06F 18/2413 |
| 2021/0158009 A1 | 5/2021 | Zhou et al. | |
| 2021/0264796 A1* | 8/2021 | Chen | G08G 5/30 |

OTHER PUBLICATIONS

Frey et al., "General Definitions: Application to Finite Elements," Mesh Generation: Application to Finite Elements, Wiley, Jan. 1, 2008, pp. 41-43.

Hardouin et al., "Next-Best-View planning for surface reconstruction of large-scale 3D environments with multiple UAVs," The 2020 IEEE/RSJ International Conference on Intelligent Robots and Systems, Oct. 25-29, 2020, Las Vegas, NV, USA, pp. 1567-1574.

Liu et al., "VGF-Net: Visual-Geometric Fusion Learning for Simultaneous Drone Navigation and Height Mapping," arXiv:2104.03109v1, Apr. 7, 2021, 12 pages.

* cited by examiner

PROCESSES FOR GENERATING AND UPDATING FLYABLE AIRSPACE FOR UNMANNED AERIAL VEHICLES

CROSS-REFERENCE TO RELATED APPLICATIONS

This application claims priority to U.S. Provisional Patent Application No. 63/262,746, filed Oct. 19, 2021, the disclosure of which is incorporated by reference herein in its entirety.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples of unmanned aerial vehicles (UAVs) include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Examples disclosed herein include systems and methods for generating and updating flyable airspace for UAVs. Routes for UAVS may be determined based on a digital surface model (DSM) of an area. More specifically, the routes may be determined by determining a confidence value of an altitude of an environmental surface and an associated terrain clearance value at each grid cell of a plurality of grid cells.

In an embodiment, a method is provided. The method includes receiving a digital surface model of an area for unmanned aerial vehicle (UAV) navigation, wherein the digital surface model represents an environmental surface in the area. The method also includes determining, for each grid cell of a plurality of grid cells in the area, a confidence value of an altitude of the environmental surface at the grid cell. The method further includes determining, for each grid cell of the plurality of grid cells in the area, a terrain clearance value based at least on the confidence value of the altitude of the environmental surface at the grid cell. The method additionally includes determining a route for a UAV through the area such that the altitude of the UAV is above the altitude of the environmental surface at each grid cell of a sequence of grid cells of the route by at least the terrain clearance value determined for the grid cell. The method also includes causing the UAV to navigate through the area using the determined route.

In another embodiment, a computing device is provided. The computing device is configured to receive a digital surface model of an area for an unmanned aerial vehicle (UAV) navigation, wherein the digital surface model represents an environmental surface in the area. The computing device is also configured to determine, for each grid cell of a plurality of grid cells in the area, a confidence value of an altitude of the environmental surface at the grid cell. The computing device is further configured to determine, for each grid cell of the plurality of grid cells in the area, a terrain clearance value based at least on the confidence value of the altitude of the environmental surface at the grid cell. The computing device is additionally configured to determine a route for a UAV through the area such that the altitude of the UAV is above the altitude of the environmental surface at each grid cell of a sequence of grid cells of the route by at least the terrain clearance value determined for the grid cell. The computing device is also configured to transmit, by the computing device to the UAV, the route for the UAV.

In a further embodiment, an unmanned aerial vehicle (UAV) is provided. The UAV is configured to receive a digital surface model of an area for unmanned aerial vehicle (UAV) navigation, wherein the digital surface model represents an environmental surface in the area. The UAV is further configured to determine, for each grid cell of a plurality of grid cells in the area, a confidence value of an altitude of the environmental surface at the grid cell. The UAV is also configured to determine, for each grid cell of the plurality of grid cells in the area, a terrain clearance value based at least on the confidence value of the altitude of the environmental surface at the grid cell. The UAV is additionally configured to determine a route for a UAV through the area such that the altitude of the UAV is above the altitude of the environmental surface at each grid cell of a sequence of grid cells of the route by at least the terrain clearance value determined for the grid cell. The UAV is further configured to navigate through the area using the determined route.

In another embodiment, a system is provided. The system includes one or more processors, a non-transitory computer readable medium, and program instructions stored on the non-transitory computer readable medium. The program instructions are executable by the one or more processors to receive a digital surface model of an area for unmanned aerial vehicle (UAV) navigation, wherein the digital surface model represents an environmental surface in the area. The program instructions are executable by the one or more processors to determine, for each grid cell of a plurality of grid cells in the area, a confidence value of an altitude of the environmental surface at the grid cell. The program instructions are executable by the one or more processors to determine, for each grid cell of the plurality of grid cells in the area, a terrain clearance value based at least on the confidence value of the altitude of the environmental surface at the grid cell. The program instructions are and executable by the one or more processors to determine a route for a UAV through the area such that the altitude of the UAV is above the altitude of the environmental surface at each grid cell of a sequence of grid cells of the route by at least the terrain clearance value determined for the grid cell. The program instructions are executable by the one or more processors to cause the UAV to navigate through the area using the determined route.

In a further embodiment, a non-transitory computer readable medium is provided. The non-transitory computer readable medium has stored therein instructions executable by one or more processors to cause a computing system to perform functions. The functions include receiving a digital surface model of an area for unmanned aerial vehicle (UAV) navigation, wherein the digital surface model represents an environmental surface in the area. The functions also include determining, for each grid cell of a plurality of grid cells in the area, a confidence value of an altitude of the environmental surface at the grid cell. The functions further include determining, for each grid cell of the plurality of grid cells in the area, a terrain clearance value based at least on the confidence value of the altitude of the environmental surface at the grid cell. The functions additionally include determining a route for a UAV through the area such that the altitude of the UAV is above the altitude of the environmental surface at each grid cell of a sequence of grid cells of the route by at least the terrain clearance value determined for the grid cell. The functions also include causing the UAV to navigate through the area using the determined route.

In another embodiment, a system is provided. The system includes means for receiving a digital surface model of an area for unmanned aerial vehicle (UAV) navigation, wherein the digital surface model represents an environmental surface in the area. The system also includes means for determining, for each grid cell of a plurality of grid cells in the area, a confidence value of an altitude of the environmental surface at the grid cell. The system further includes means for determining, for each grid cell of the plurality of grid cells in the area, a terrain clearance value based at least on the confidence value of the altitude of the environmental surface at the grid cell. The system additionally includes means for determining a route for a UAV through the area such that the altitude of the UAV is above the altitude of the environmental surface at each grid cell of a sequence of grid cells of the route by at least the terrain clearance value determined for the grid cell. The system also includes means for causing the UAV to navigate through the area using the determined route.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
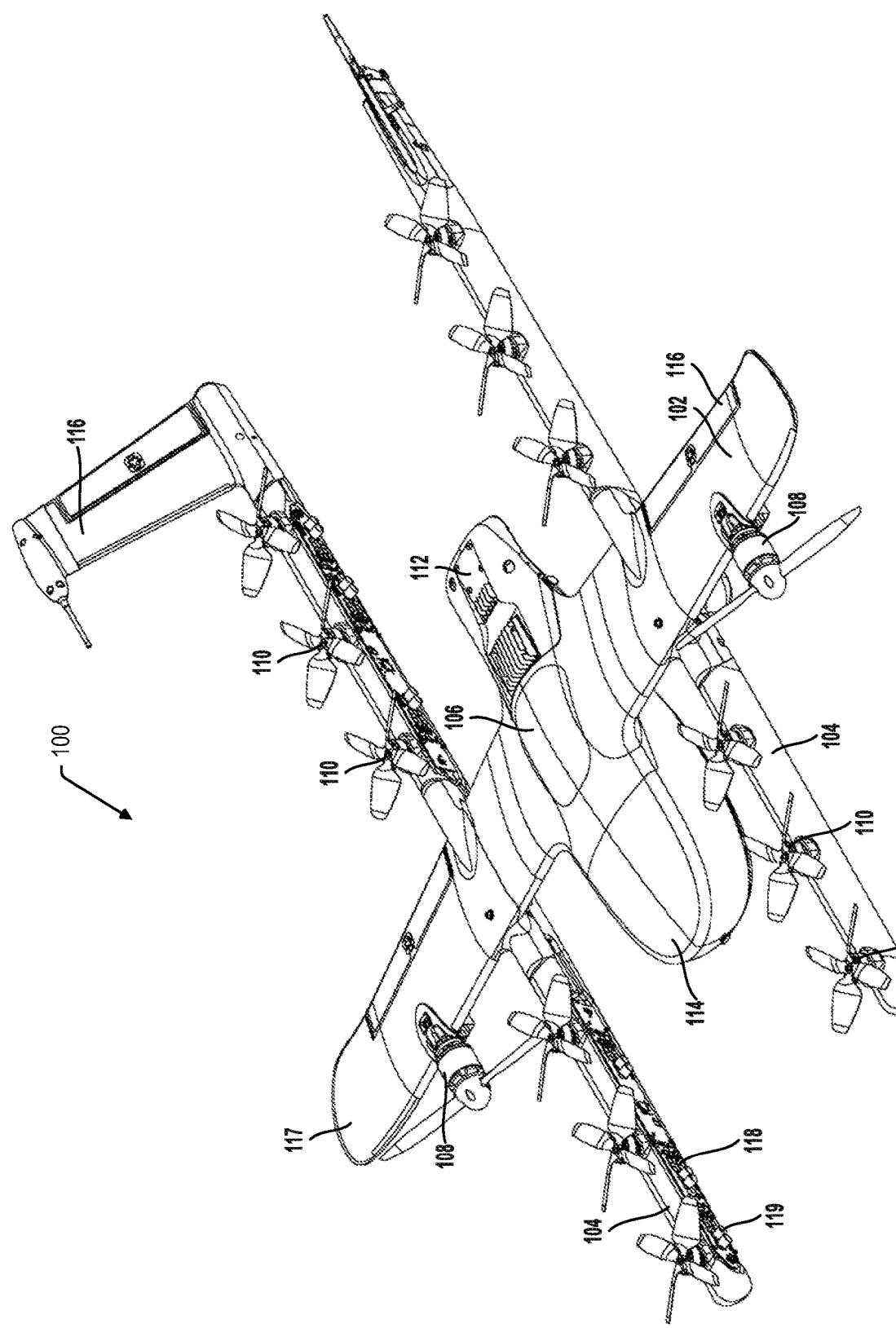
FIG. 1A is an illustration of an unmanned aerial vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For the purposes of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

In examples described herein, a planner (e.g., a software program that generates flight paths for one or more UAVs) may need to know the terrain height for all of the potential areas that a UAV can fly over to ensure that a planned flight does not result in the UAV coming into contact (or coming close to) the terrain. The planner therefore may make use of a Digital Surface Model (DSM) representation of the world. A DSM refers to an elevation model that captures both the environment's natural and artificial features. In order for the planner to generate flight paths, the DSM may need to be accurate and fresh. DSMs for large areas may be available from satellite imagery providers, but those may be several years old in general (and therefore may not represent the real world).

A DSM may be generated using imagery captured from UAVs. However, in order to generate the DSM, the UAVs may need to perform a large number of flights while capturing images. Flying that many missions without an accurate and fresh DSM may be problematic.

Examples described herein therefore involve using an existing (and therefore degraded accuracy and freshness) DSM (e.g., from a satellite imagery provider) in the beginning and ensuring that all planned flights maintain a significant clearance from the terrain to account for the inaccuracy and staleness of the DSM. The amount of terrain clearance may match the expected staleness and inaccuracies of the DSM. Using an increased terrain clearance in the beginning may help prevent the UAV from coming into contact with the terrain even when using an imperfect model of the world during the planning process.

As UAVs fly over the area using an existing DSM, they may be collecting imagery (along with their associated GPS locations) that can then be used for accurately georeferenced 3D reconstructions. These 3D reconstructions can then be used to update the DSM. Additionally, they may be used to update a confidence value (on a per geographic cell basis) for the DSM. The terrain clearance value that the planner uses may be adjusted based on this confidence value. For example, when the updated DSM is available for a given geographical area, the confidence value for that area may increase, and in turn, the terrain clearance value may be decreased for that area. In this manner, more airspace is freed for the UAV to fly in and the range of the UAV is also increased (as with a lower terrain clearance value, the aircraft may then not be required to ascend as much to perform a mission).

Even when the updated DSM is available for a given area, a UAV may not fly over that area for an extended period of time after those updates were performed. In such cases, the DSM confidence values may be decreased for those areas and in turn, the terrain clearance value may be increased such that the planner may generally use a higher terrain clearance when it is not confident in the DSM.

Alternative approaches may rely on manual on-site inspections for obstacle and UAV flight path evaluation. However, these approaches may be time consuming, prone to human errors, unreasonably limit the available airspace, and reduce the range of the aircraft. As a result, it may be desirable to define confidence values and terrain clearance values for flight areas to reflect confidence in the DSM. This may advantageously allow for more reliable performance of flight operations, including reducing the likelihood of UAVs colliding into objects in the environment.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. EXAMPLE UNMANNED VEHICLES

Herein, the terms "unmanned aerial system" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
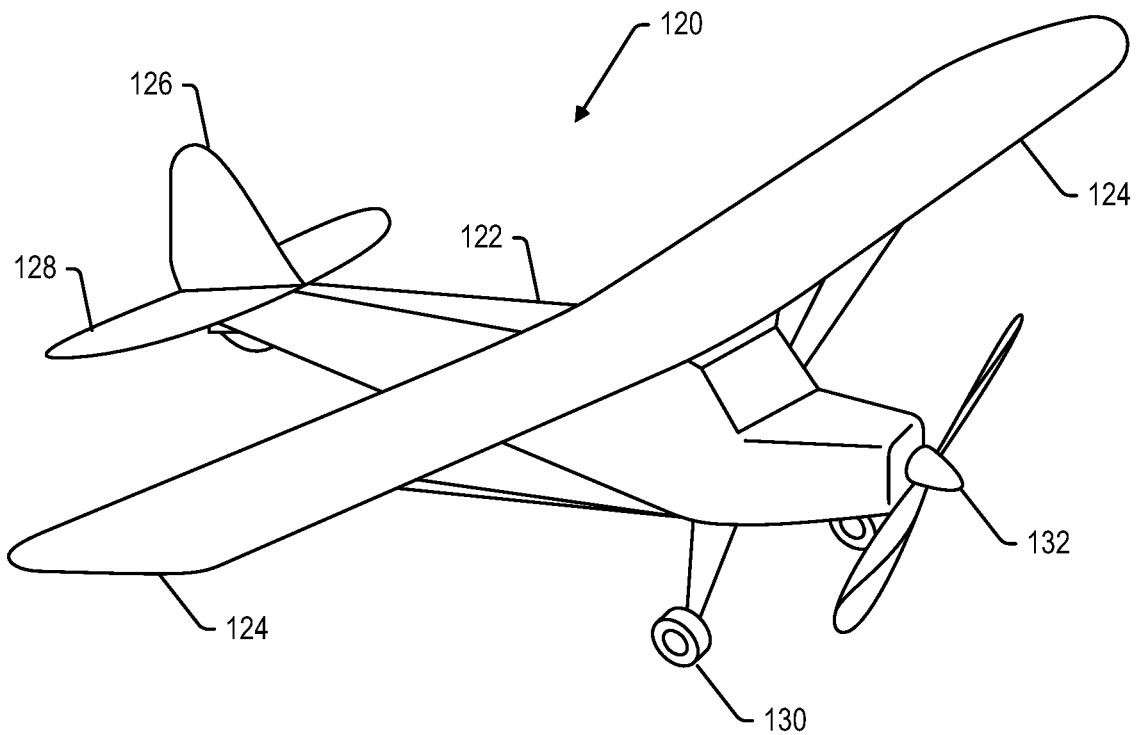
FIG. 1B is a simplified illustration of an unmanned aerial vehicle, in accordance with example embodiments.

Similarly, FIG. 1B shows another example of a fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
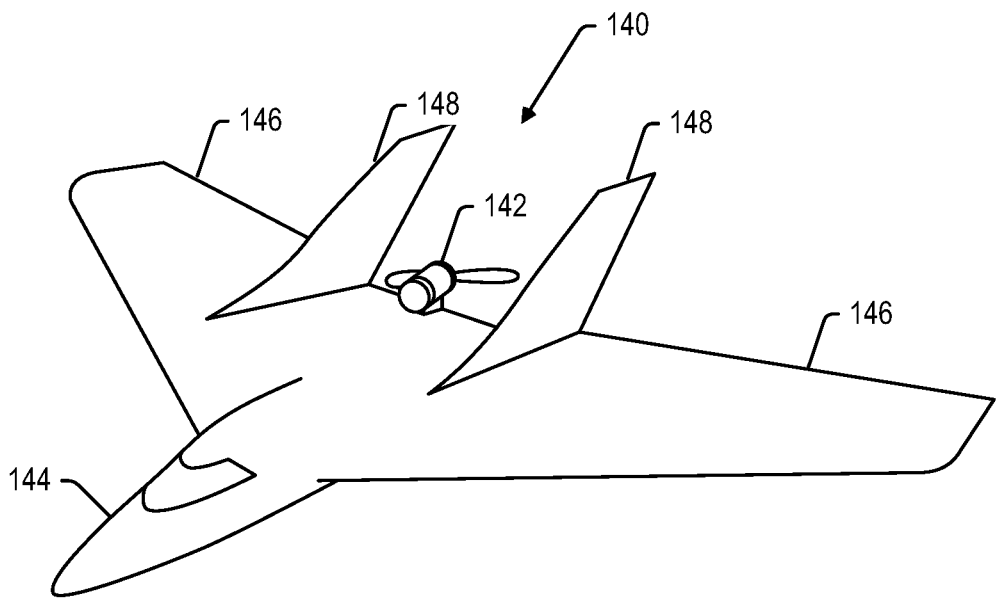
FIG. 1C is a simplified illustration of an unmanned aerial vehicle, in accordance with example embodiments.

FIG. 1C shows an example of UAV 140 with a propeller in a pusher configuration. The term "pusher" refers to the fact that propulsion unit 142 is mounted at the back of UAV 140 and "pushes" the vehicle forward, in contrast to the propulsion unit 142 being mounted at the front of UAV 140. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
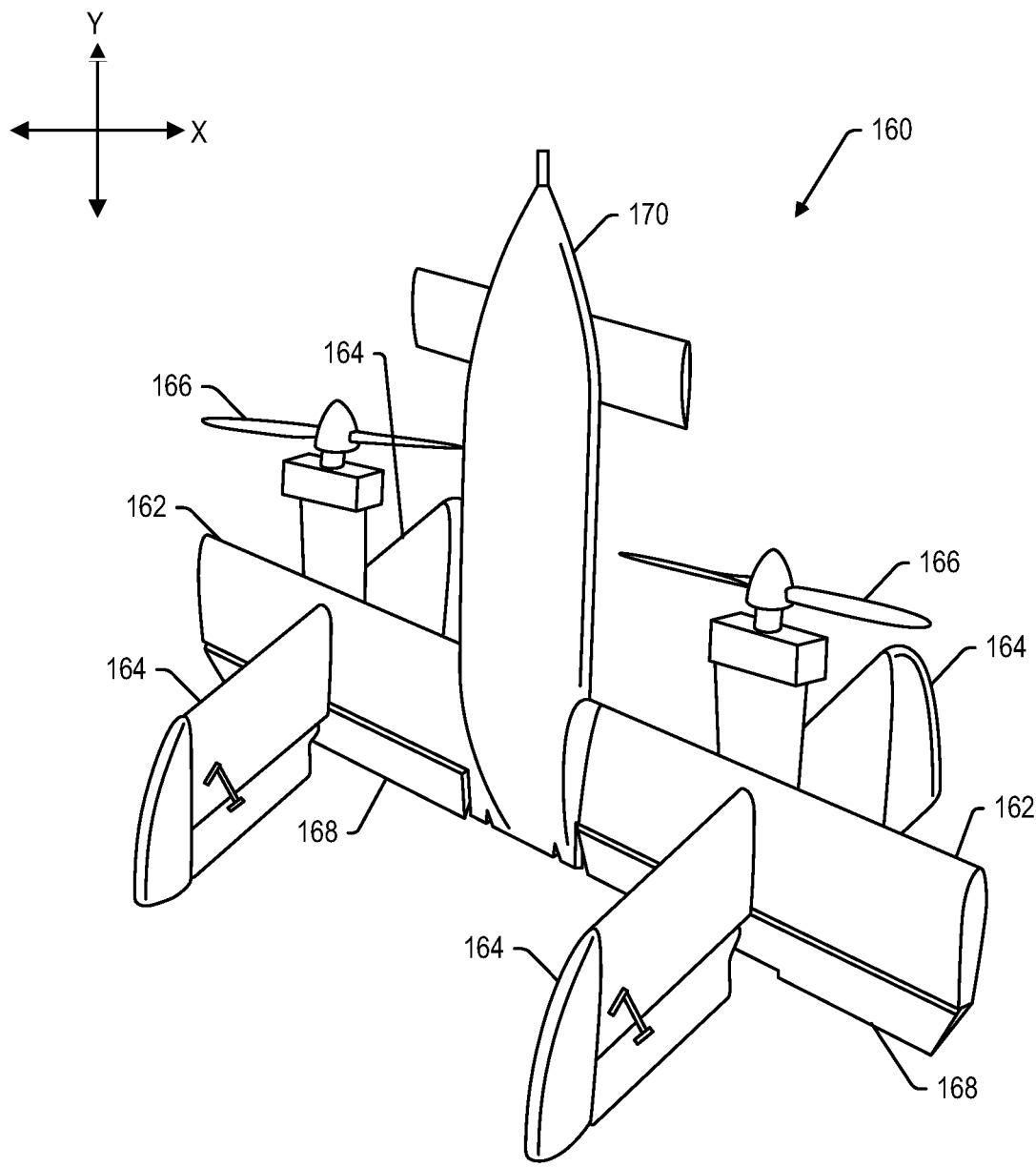
FIG. 1D is a simplified illustration of an unmanned aerial vehicle, in accordance with example embodiments.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
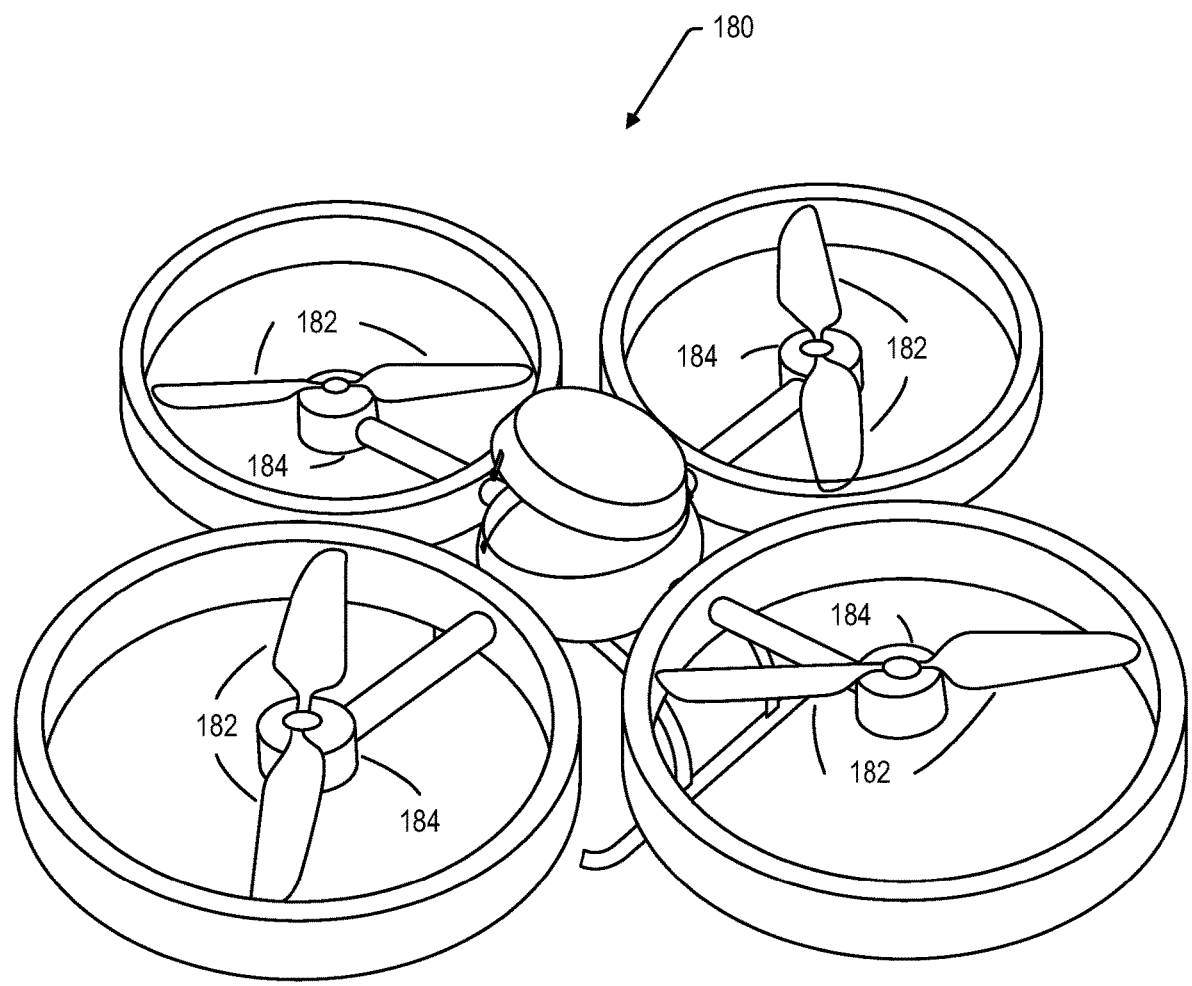
FIG. 1E is a simplified illustration of an unmanned aerial vehicle, in accordance with example embodiments.

As noted above, some embodiments may involve other types of UAVs, in addition to or in the alternative to fixed-wing UAVs. For instance, FIG. 1E shows an example of rotorcraft 180 that is commonly referred to as a multicopter. Multicopter 180 may also be referred to as a quadcopter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

Figure 2:
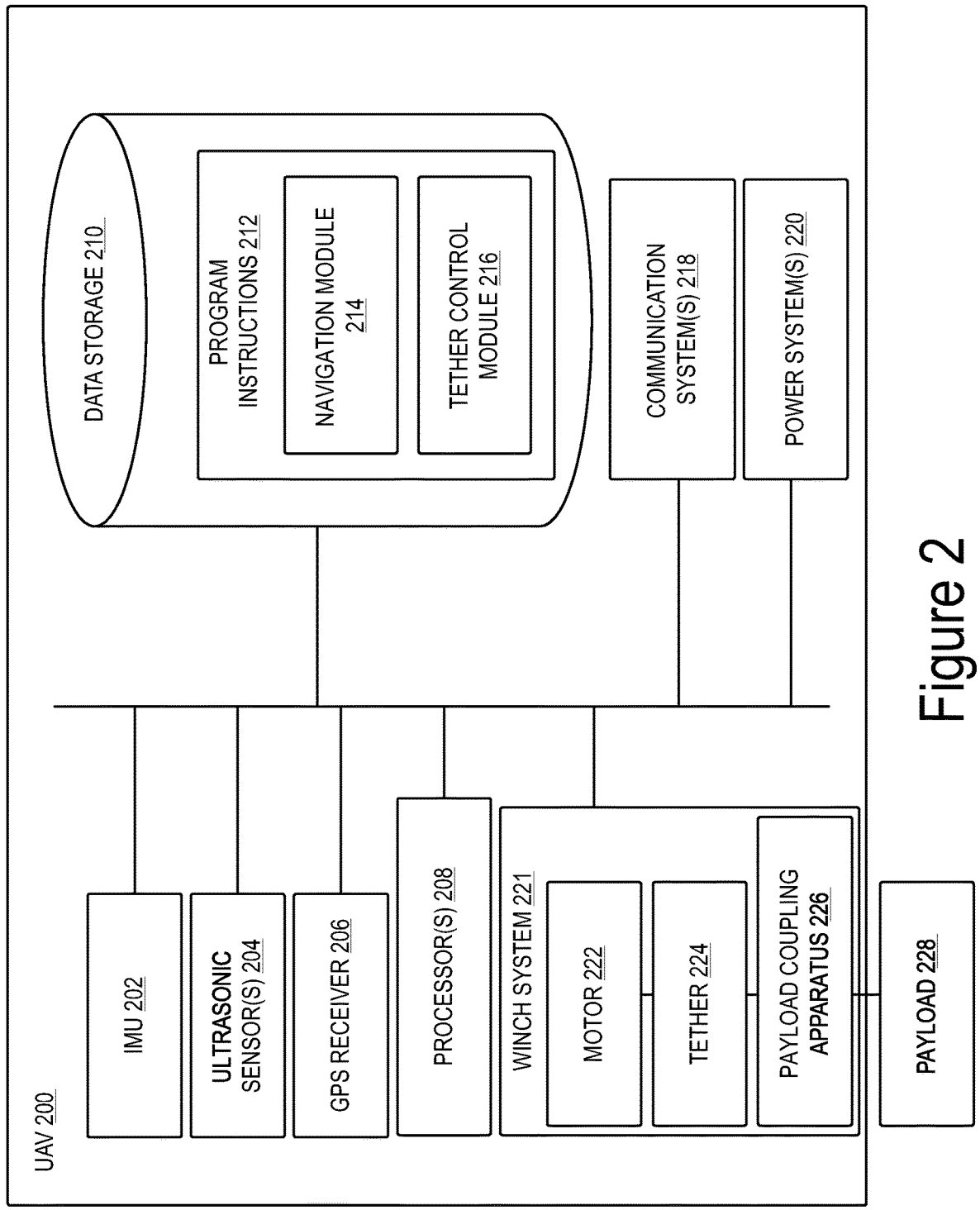
FIG. 2 is a simplified block diagram illustrating components of an unmanned aerial system, in accordance with example embodiments.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS receiver 206, among other possible sensors and sensing systems.

In the illustrated embodiment, UAV 200 also includes processor(s) 208. Processor 208 may be a general-purpose processor or a special purpose processor (e.g., digital signal processors, application specific integrated circuits, etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein. For instance, in the illustrated embodiment, program instructions 212 include navigation module 214 and tether control module 216.

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to the caller's location, as indicated, at least in part, by the GPS coordinates provided by their mobile device. Other examples are also possible.

Navigation module 214 may provide functionality that allows UAV 200 to, for example, move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location, navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in reaching the specific target delivery location. For example, the UAV 200 may display a visual message requesting such assistance in a graphic display or play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals—in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

In a further aspect, UAV 200 includes one or more communication system(s) 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 902.11 protocol), Long-Term Evolution (LTE), WiMAX (e.g., an IEEE 902.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication systems 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may one or more food items, purchased goods, medical items, or any other object(s) having a size and weight suitable to be transported between two locations by the UAV. In other embodiments, payload 228 may simply be the one or more items that are being delivered (e.g., without any package housing the items).

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include winch system 221 controlled by tether control module 216 in order to lower payload 228 to the ground while UAV 200 hovers above. As shown in FIG. 2, winch system 221 may include tether 224, and tether 224 may be coupled to payload 228 by payload coupling apparatus 226. Tether 224 may be wound on a spool that is coupled to motor 222 of the UAV. Motor 222 may take the form of a DC motor (e.g., a servo motor) that can be actively controlled by a speed controller. Tether control module 216 can control the speed controller to cause motor 222 to rotate the spool, thereby unwinding or retracting tether 224 and lowering or raising payload coupling apparatus 226. In practice, the speed controller may output a desired operating rate (e.g., a desired RPM) for the spool, which may correspond to the speed at which tether 224 and payload 228 should be lowered towards the ground. Motor 222 may then rotate the spool so that it maintains the desired operating rate.

In order to control motor 222 via the speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as motor 222 causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

Based on the data from the speed sensor, tether control module 216 may determine a rotational speed of motor 222 and/or the spool and responsively control motor 222 (e.g., by increasing or decreasing an electrical current supplied to motor 222) to cause the rotational speed of motor 222 to match a desired speed. When adjusting the motor current, the magnitude of the current adjustment may be based on a proportional-integral-derivative (PID) calculation using the determined and desired speeds of motor 222. For instance, the magnitude of the current adjustment may be based on a present difference, a past difference (based on accumulated error over time), and a future difference (based on current rates of change) between the determined and desired speeds of the spool.

In some embodiments, tether control module 216 may vary the rate at which tether 224 and payload 228 are lowered to the ground. For example, the speed controller may change the desired operating rate according to a variable deployment-rate profile and/or in response to other factors in order to change the rate at which payload 228 descends toward the ground. To do so, tether control module 216 may adjust an amount of braking or an amount of friction that is applied to tether 224. For example, to vary the tether deployment rate, UAV 200 may include friction pads that can apply a variable amount of pressure to tether 224. As another example, UAV 200 can include a motorized braking system that varies the rate at which the spool lets out tether 224. Such a braking system may take the form of an electromechanical system in which motor 222 operates to slow the rate at which the spool lets out tether 224. Further, motor 222 may vary the amount by which it adjusts the speed (e.g., the RPM) of the spool, and thus may vary the deployment rate of tether 224. Other examples are also possible.

In some embodiments, tether control module 216 may be configured to limit the motor current supplied to motor 222 to a maximum value. With such a limit placed on the motor current, there may be situations where motor 222 cannot operate at the desired rate specified by the speed controller. For instance, there may be situations where the speed controller specifies a desired operating rate at which motor 222 should retract tether 224 toward UAV 200, but the motor current may be limited such that a large enough downward force on tether 224 would counteract the retracting force of motor 222 and cause tether 224 to unwind instead. A limit on the motor current may be imposed and/or altered depending on an operational state of UAV 200.

In some embodiments, tether control module 216 may be configured to determine a status of tether 224 and/or payload 228 based on the amount of current supplied to motor 222. For instance, if a downward force is applied to tether 224 (e.g., if payload 228 is attached to tether 224 or if tether 224 gets snagged on an object when retracting toward UAV 200), tether control module 216 may need to increase the motor current in order to cause the determined rotational speed of motor 222 and/or spool to match the desired speed. Similarly, when the downward force is removed from tether 224 (e.g., upon delivery of payload 228 or removal of a tether snag), tether control module 216 may need to decrease the motor current in order to cause the determined rotational speed of motor 222 and/or spool to match the desired speed. As such, tether control module 216 may be configured to monitor the current supplied to motor 222. For instance, tether control module 216 could determine the motor current based on sensor data received from a current sensor of the motor or a current sensor of power system 220. In any case, based on the current supplied to motor 222, tether control module 216 may determine if payload 228 is attached to tether 224, if someone or something is pulling on tether 224, and/or if payload coupling apparatus 226 is pressing against UAV 200 after retracting tether 224. Other examples are possible as well.

During delivery of payload 228, payload coupling apparatus 226 can be configured to secure payload 228 while being lowered from the UAV by tether 224, and can be further configured to release payload 228 upon reaching ground level. Payload coupling apparatus 226 can then be retracted to the UAV by reeling in tether 224 using motor 222.

In some implementations, payload 228 may be passively released once it is lowered to the ground. For example, a passive release mechanism may include one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

Figure 3:
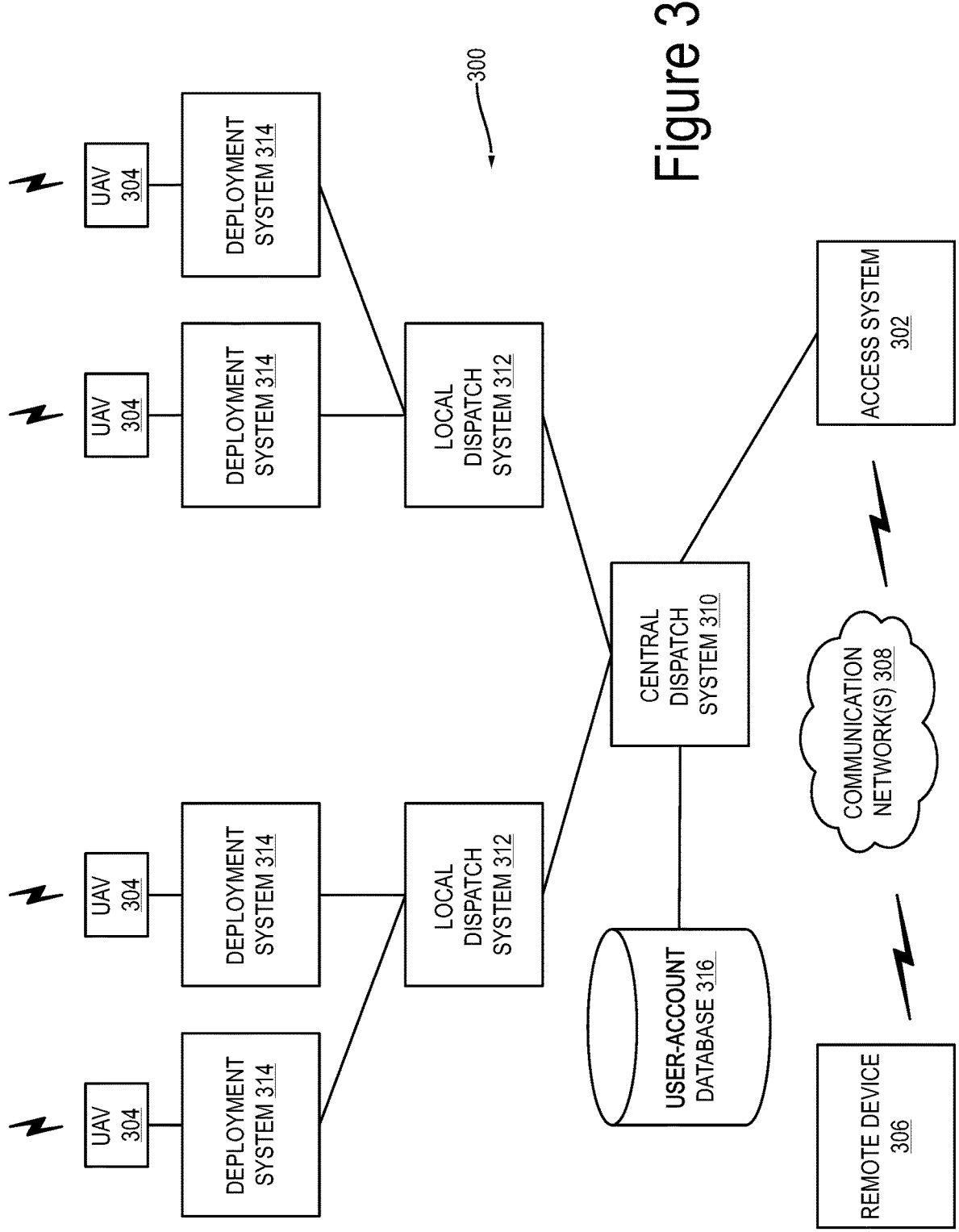
FIG. 3 is a simplified block diagram illustrating a distributed UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UAVs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, 1C, 1D, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be multiple instances of remote device 306 associated with a common item provider account (e.g., an account used by multiple employees and/or owners of a particular restaurant). Additionally, in such embodiments, remote device 306 may be utilized to send item provider submissions to a transport provider computing system (e.g., central dispatch system 310 and or local dispatch system 312), which each indicate a respective quantitative measure for a given amount of UAV transport service at a given future time. For example, remote device 306 may be utilized to generate and send an item provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. Deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to deployment system 314 for re-deployment.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse).

However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an aerial transport service provider (ATSP) to deliver, can register for an item provider account with UAV system 300. As such, user-account database 316 may include authorization information for a given item provider account (e.g., one or more user name and password combinations), and/or other information that may be used to authorize access to a given item provider account. Alternatively, data for item provider accounts may be kept in a separate database from recipient user accounts. Other data structures and storage configurations for storing such account data are also possible.

Figure 4:
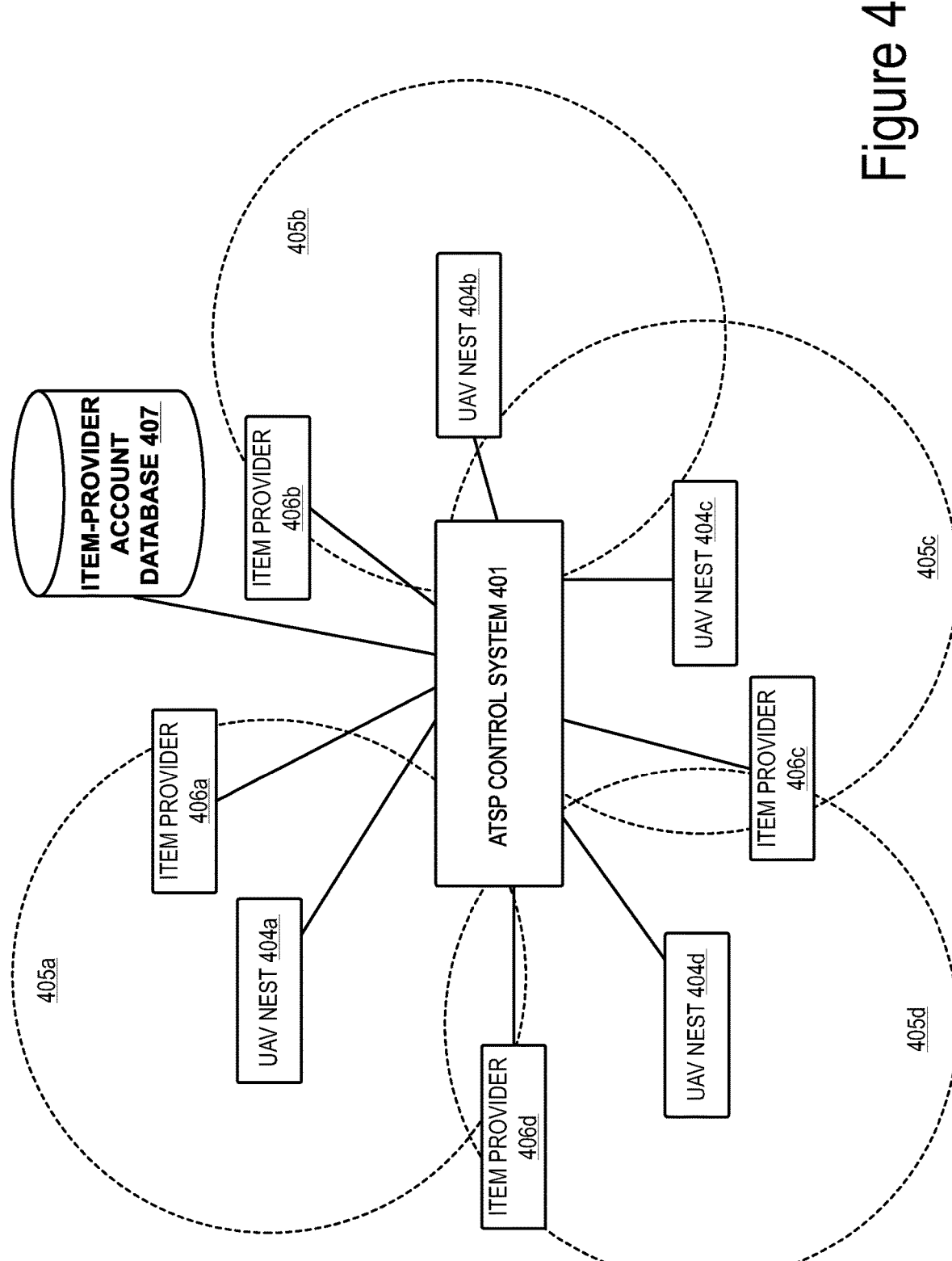
FIG. 4 is a block diagram showing an example arrangement for an aerial transport provider control system, in accordance with example embodiments.

An aerial transport service provider (ATSP) may be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the ATSP, via which the third-parties can request and/or purchase UAV transport services from the ATSP. Further, the third-party entities could interface with recipients (e.g., customers) directly, or through computing systems (e.g., applications and/or server systems) provided by the ATSP FIG. 4 is a block diagram showing an example arrangement for an aerial transport service provider control system 401, which coordinates UAV transport services for a plurality of item providers that are located remotely from the service provider's central UAV dispatch locations (e.g., UAV nests). The ATSP may be a separate entity from the item providers. As shown, ATSP control system 401 may be communicatively coupled to computing or control systems of UAV nests 404a, 404b, 404c, and 404d (i.e., UAV nests 404a-d), and communicatively coupled to computing systems of item providers 406a, 406b, 406c, and 406d (i.e., item providers 406a-d). Such communicative couplings may be implemented using various types of wired and/or wireless communication protocols and networks.

Each of UAV nests 404a-d is a facility where UAVs can be stored for at least a short period of time, and from which UAVs can begin carrying out a UAV transport task (e.g., where UAVs can take off). In some implementations, some or all of the UAV nests may take the form of a local dispatch system and one or more deployment systems, such as those described in reference to FIG. 3 above. Of course, some or all of the UAV nests could also take other forms and/or perform different functions.

Each of the computing systems of item providers 406a-d may be associated with a different item provider account. As such, one or more of the computing systems associated with item providers 406a-d may include one or more computing devices that are authorized to access the corresponding item provider account with the ATSP. Further, the ATSP may store data for item provider accounts in an item provider account database 407.

In practice, one or more of the computing systems of item providers 406a-d may include one or more remote computing devices (e.g., such as one or more remote devices 306 described in reference to FIG. 3), which have logged in to or otherwise been authorized to access the same item provider account (e.g., cell phones, laptops, and/or computing devices of a business's employees). Additionally or alternatively, one or more of the computing systems of item providers 406a-d may be implemented with less of an ad-hoc approach; e.g., with one or more user-interface terminals installed at the item provider's facilities. Other types of item provider computing systems are also possible.

In order to provide UAV transport services to various item providers in an efficient and flexible manner, ATSP control system 401 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

\The dynamic assignment of UAVs to flights for a number of different item providers can help an ATSP to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, ATSP control system 401 can dynamically redistribute UAVs amongst a number of UAV deployment locations (which may be referred to as, e.g., "hubs" or "nests") through a service area, according to time-varying levels of demand at various locations or sub-areas within the service area.

Each respective UAV nest of UAV nests 404a-d is shown as having associated therewith a corresponding geographic area 405a, 405b, 405c, and 405d, respectively (i.e., geographic areas 405a-d), within which UAVs of the respective UAV nest provide transport services to item providers and/or item recipients. The geographic area served by a given UAV nest may be defined, at least in part, by the flight range(s) of the UAVs that are located at or scheduled to be located at the given UAV nest. In some implementations, the geographic areas 405a-d corresponding to UAV nests 404a-d may each have a fixed size, which does not vary over time. In other implementations, the size of each of geographic areas 405a-d could vary over time based on various factors, such as demand for UAV transport services in the geographic area and/or nearby geographic areas, the number and/or capabilities of UAVs allocated to operate from the corresponding UAV nest, and/or the number and/or characteristics of item providers located near to the UAV nest, among other possibilities.

Additionally or alternatively, the size of each of geographic areas 405a-d could vary on an order-by-order basis, and/or vary by item provider. More specifically, when a transport task involves three or more flight legs (e.g., a flight from the UAV nest to the item provider for pick-up, a flight from the item provider to a delivery location, and a return flight to the UAV nest), there may be two or more flight legs before delivering an item. Thus, the evaluation of whether or not a given item provider is within the geographic service area of a UAV nest for a given transport task may depend on a combination of the distance from the UAV nest to the item pick-up location, the distance from the pick-up location to the delivery location, and the distance from the delivery location to the UAV nest. As a result, a given UAV nest may be able to serve a given item provider for one transport task, but not for another. In this context, it is possible that the notion of a defined "geographic service area" might not be utilized at all. Instead, ATSP control system 401 may simply evaluate whether a UAV transport task can be implemented on a task-by-task basis, given all of the parameters for completion of the task.

Since certain item providers can only be served by (or are better served by) a certain UAV nest or nests, and because demand for UAV transport services can vary between item providers, ATSP control system 401 may, for a given geographic/service area, implement an ongoing process to distribute and redistribute UAVs amongst the UAV nests 404a-d that collectively serve the given area. In particular, ATSP control system 401 may continually, periodically, or from time-to-time evaluate demand and/or other factors for each item provider 406a-d, and determine a respective number of UAVs that are desirable at each of UAV nests 404a-d, in order to meet the demand for UAV transport tasks in the corresponding geographic area. Additionally or alternatively, ATSP control system 401 could determine a respective number of UAVs that are desirable at each of UAV nest 404a-d such that UAV nests 404a-d can collectively meet demand for UAV transport services in the larger area collectively served by the UAV nests 404*a-d*.

III. EXAMPLE SYSTEMS AND METHODS FOR GENERATING AND UPDATING FLYABLE AIRSPACE FOR UAVS

Figure 5:
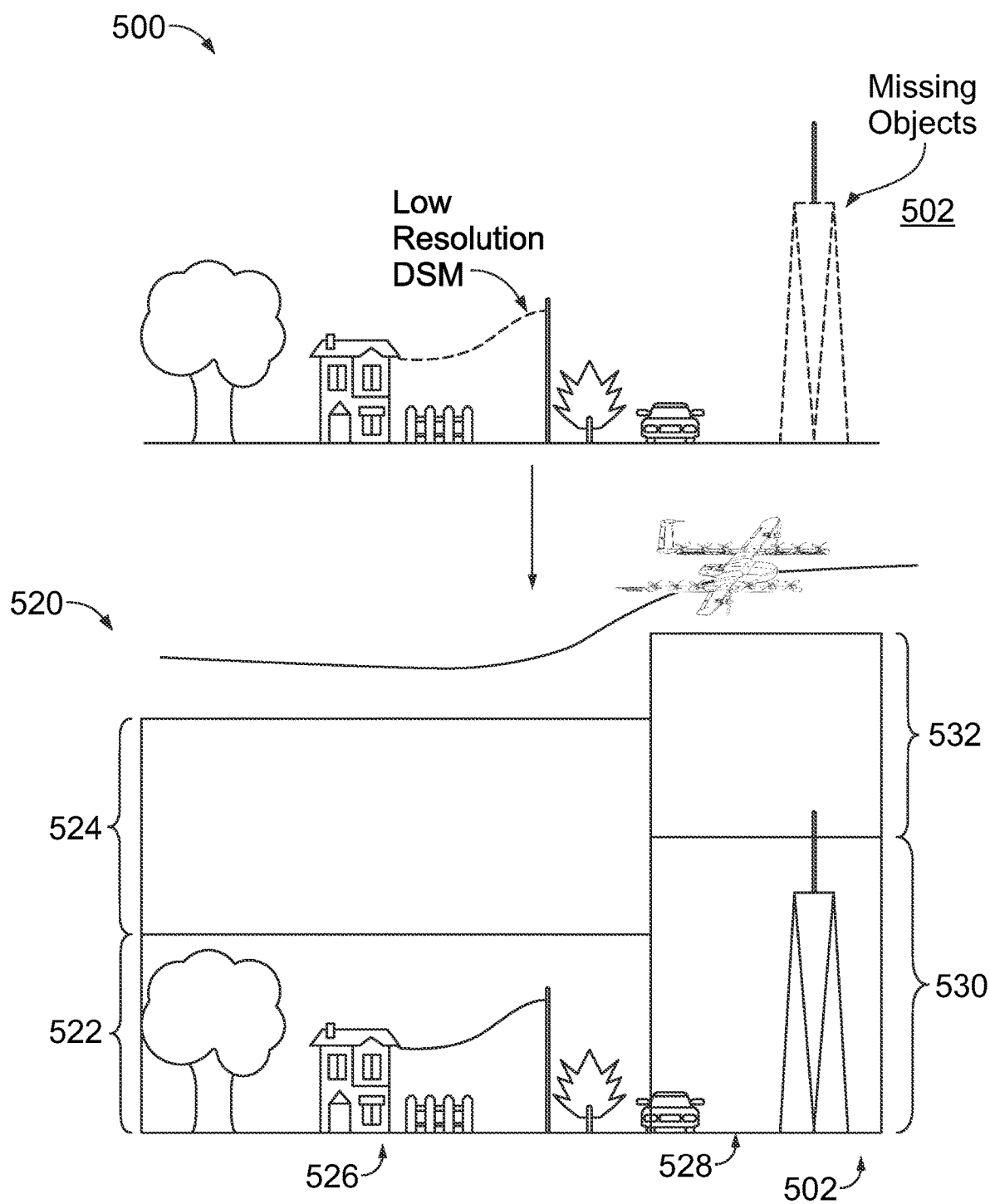
FIG. 5 illustrates confidence values and terrain clearance values of an environment, in accordance with example embodiments.

FIG. 5 depicts environment 500 and terrain model 520 including confidence values and terrain clearance values in environment 500, in accordance with example embodiments. In order for a UAV to fly over environment 500, the UAV may retrieve a DSM that may contain information regarding the altitude of objects in environment 500. The UAV may use the DSM to determine how high it should fly so as to not collide into objects in the environment. In some examples, however, the DSM may be dated such that the DSM might no longer accurately represent conditions in the environment. For example, a DSM may have had a last update a year prior, and during that year, a new building was built. If the UAV was to use that DSM as if it accurately represented the environment and fly reasonably far from the altitudes of objects in that DSM, the UAV may collide into the newly built building.

As an example, environment 500 may include object 502, at least a portion of which may be missing from a DSM for various reasons (e.g., the DSM may have been last updated prior to the building being fully built, the building may not have been fully detected due to inaccurate sensor data when the DSM was last updated, etc.). Environment 500 may also include various other objects, including those that are naturally occurring (e.g., trees), as well as man-made objects (e.g., houses, skyscrapers, other buildings). Environment 500 is provided as an example, and environments in general may include many other objects and features not described herein. For example, environments may also include hills, mountains, power lines, and other objects that may need to be accounted for in route planning.

To allow for any changes and/or inaccuracies in the environment, a UAV or a server device may determine confidence values and terrain clearance values. For a DSM that has not been updated for a long time, the confidence values may be set relatively low to reflect low confidence in the accuracy of the DSM. The terrain clearance values may then be set relatively high based on the low confidence values.

For example, terrain model 520 of environment 500 includes vertical areas 526 and 528. Area 526 includes area 522, which corresponds to altitudes of objects in vertical area 526 in environment 500 as depicted by a DSM, and area 524, which corresponds to terrain clearance values of vertical area 526 in environment 500. Vertical area 528 similarly includes area 530, which corresponds to altitudes of objects in vertical area 528 as depicted by a DSM, and area 530, which corresponds to terrain clearance values of vertical area 528. Area 524 and area 532, both of which correspond to terrain clearance values, are depicted as darker regions to represent the low confidence that the altitudes are accurate.

It may be observed that area 530 representing altitudes of objects in vertical area 528 does not cover object 502 completely. And thus, if a UAV were to take a route close to areas 522 and 530, the UAV may collide with object 502. As mentioned above, these inconsistencies in the environment may be caused by a variety of reasons, and for a DSM that has an uncertain accuracy, the terrain clearance values may be set relatively high.

Figure 6:
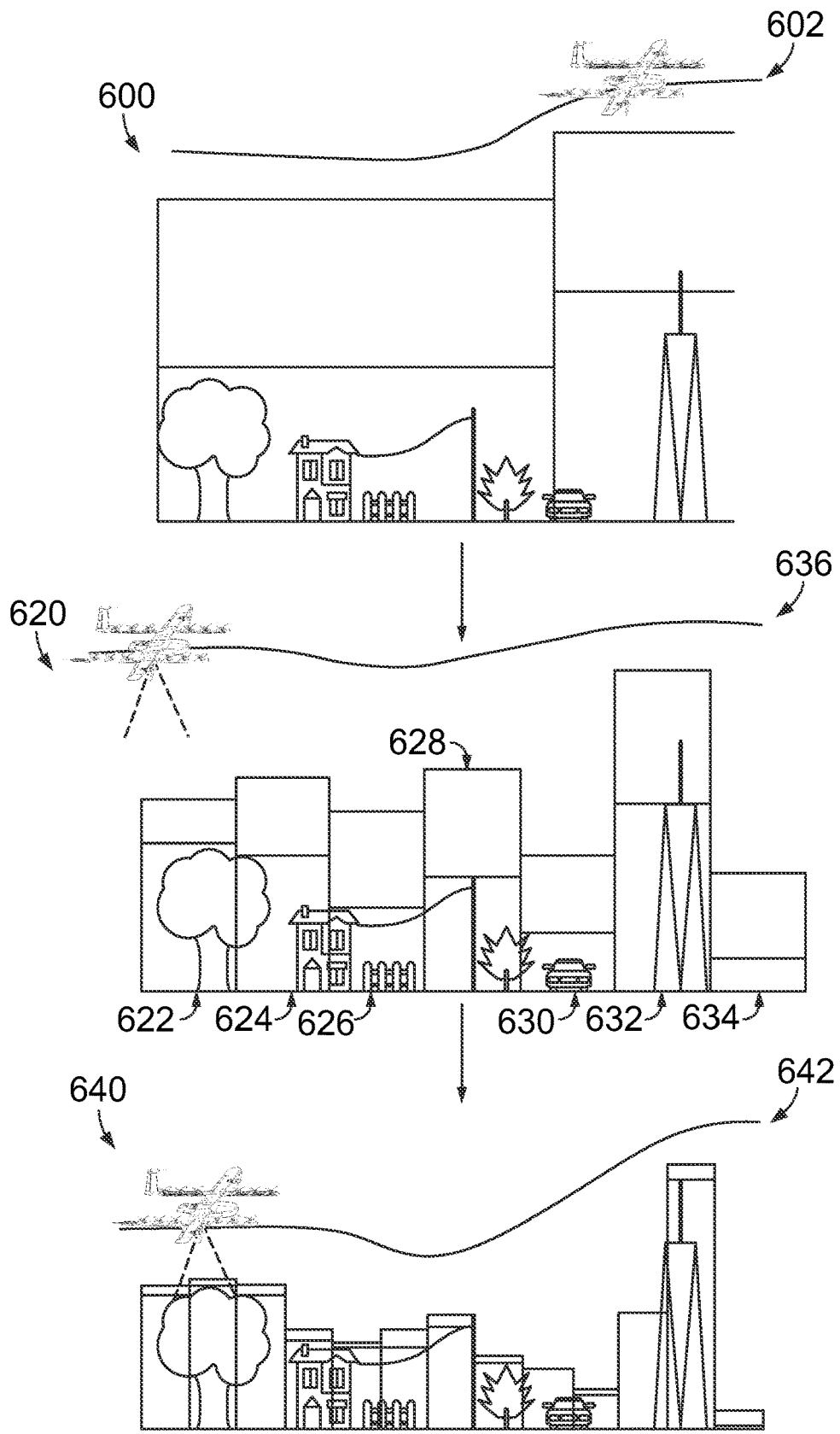
FIG. 6 illustrates adjusting of the confidence values and terrain clearance values of an environment, in accordance with example embodiments.

FIG. 6 illustrates adjusting the confidence values and terrain clearance values of an environment, in accordance with example embodiments. FIG. 6 includes terrain models 600, 620, and 640, which may be representative of the same environment as environment 500. Terrain model 600 may be described in line with the description of terrain model 520.

A UAV may collect sensor data representing environment 500 while navigating through environment 500 in accordance with terrain model 600. As the UAV collects additional data representing environment 500, the UAV may adjust confidence levels and terrain clearance values to be more in line with its observations of the environment.

For example, a UAV may use terrain model 600 to navigate through environment 500 to collect additional information representing environment 500. In some examples, the UAV may navigate through the environment at a level above the altitude levels and the terrain clearance levels, e.g., through the path marked by route 602. After collecting and analyzing the sensor data, the UAV may determine adjusted confidence levels and adjusted terrain clearance values to be in line with terrain model 620.

Specifically, the two areas of terrain model 600 may be adjusted into areas 622, 624, 626, 628, 630, 632, and 634. Because the UAV may have collected sensor data representing the environment at a more recent point in time, many of the areas of terrain model 620 may be adjusted to be associated with higher confidence levels. Specifically, vertical areas 622, 624, 626, 628, 630, and 634 may be adjusted to have higher confidence levels. And based on these higher confidence levels, the terrain clearance values may also be lowered compared to terrain model 600. Further, due to the higher confidence, lower terrain clearance values, and/or the additional collected sensor data, terrain model 620 may also be assigned a smaller grid size than terrain model 600.

The improved terrain model may be used in UAV navigation so that UAV routes are generated closer to the objects in the environment. For example, in line with the adjusted terrain clearance values and the adjusted altitudes, a UAV navigating through environment 500 using terrain model 620 may determine route 636 as a possible path through which to navigate. Route 636 may be generally closer to the ground compared to route 602, causing route 636 to be less expensive in time and resources required to navigate through, while maintaining a reasonable level of accuracy.

In some examples, each grid cell (e.g., each vertical area as depicted in FIGS. 5 and 6) may have different confidence values and terrain clearance values in accordance with sensor data that has been collected, UAV activity in the area, and/or other factors. For example, vertical cell 632 may have a lower confidence value than the other vertical areas in terrain model 620. This may be due to various factors. For example, the UAV may have determined a lower confidence value because it previously detected a higher point at that location, and thus it is less confident in the lower altitude (e.g., as a result of vertical cell 632 containing difficult-to-detect objects such as a building spire or a power line). However, the altitudes corresponding to the other vertical areas may be consistent with previous data.

In some examples, the confidence value of each grid cell may be determined by the amount of sensor data that has been collected at the grid cell through a frequency count indicative of how many samples were collected for the grid cell. For example, one or more UAVs may navigate through environment 500 several times, passing through areas 622, 624, 626, 628, 630, and 634 through various routes. In contrast, the UAVs may navigate through area 632 only once or twice, thereby making the frequency count of how many samples are collected representing environment 500 at area 632 less than the frequency count of how many samples are collected representing environment 500 at areas 622, 624, 626, 628, 630, and 634. The confidence values at areas 622, 624, 626, 628, 630, and 634 corresponding to confidence in the DSM having accurate altitudes at areas 622, 624, 626, 628, 630, and 634 may thus be higher than the confidence value at area 632 corresponding to confidence in the DSM having an accurate altitude at area 632. As stated above, terrain clearance values at grid cells may be dependent on the confidence values. Therefore, the terrain clearance value at area 632 may be greater than the terrain clearance value at areas 622, 624, 626, 628, 630, and 634.

In some examples, the terrain clearance value for a grid cell may also be determined based on the confidence of the UAV in having accurately localized itself as well. For example, a UAV may be navigating in environment 500 with many different features (e.g., buildings, trees, homes, and other objects) that result in the UAV being able to locate itself relatively accurately (e.g., above a particular building). However, a UAV navigating in a different environment, perhaps with a fewer variety of features (e.g., in a cornfield), may have a harder time being able to locate itself accurately. A UAV navigating in either environment may nevertheless need to avoid colliding into potential features in the environment, but in the latter example, in addition to being unsure of the DSM, the UAV may also be unsure of its location in the environment. The terrain clearance value may thus also be based on how confident the UAV is of its location in the environment to avoid colliding into features in the environment, and the terrain clearance value may decrease as the UAV becomes more confident that it has accurately located itself.

In some examples, the terrain clearance value for each grid cell may be based on values calculated through a statistical distribution, e.g., a cumulative distribution function. Specifically, the UAV may determine a statistical distribution of a probability that an environmental altitude at the grid cell is below the estimated environmental altitude plus the terrain clearance value, and based on the statistical distribution, determine the terrain clearance value associated with a certain percentile value of the statistical distribution. For example, the certain percentile value of the statistical distribution may be the 99.99th percentile. The value at the 99.99th percentile of the statistical distribution may be retrieved to obtain a terrain clearance value to use such that there is a 99.99% probability that the environmental altitude at the grid cell is below the estimated environmental altitude plus the obtained terrain clearance value.

Using north, east, down (NED) coordinates, if the environmental altitude at the grid cell for a column with XY coordinates (x, y) is z, then the voxel (x, y, z) is occupied and all voxels (x, y, z') where z'<z are vacant. In some examples, it may be assumed that unobserved voxels have a maximum uncertainty/entropy (e.g., probability of occupancy O is 0.5). A voxel with coordinates (x, y, z) may be considered. The probability that this voxel represents the surface at location (x, y) is $P(H=z|Z)=P(O_{x,y,z}=1|Z)\Pi_{z'<z}P(O_{x,yz'}=0|Z)$ where $O_{x,y,z}$ denotes the occupancy random variable for the voxel characterized by Cartesian coordinates (x, y, z) and Z denotes the set of sensor measurements. Let the coordinates of the voxel (in the column) that maximizes this probability be (x, y, z*). If $P(H=z*|Z)>\alpha$ (where $\alpha$ is the acceptance threshold (for example, 0.9)), then the estimate for H may be set to z*. Otherwise, H may be set to the NED z-floor, z (most negative z coordinate in the voxel space), $\alpha$ may be set to a value greater than 0.5 to ensure unobserved voxels will not be identified as free space. This may produce overestimation of the environmental altitude at the grid cell. However, this overestimation may be acceptable as the proposed approach may involve conducting flights that explore such unobserved voxels causing them to be associated with more accurate probabilities of occupancy. Other methods of determining the environmental altitude at a grid cell are also possible (e.g., a maximum a posteriori estimation of occupancy random variables).

In some examples, the threshold percentile value may be based on the application of the UAV. For example, if the UAV is being applied for delivering packages directly to people, the certain percentile value may be set higher, because the UAV is operating in a location with people. Whereas, if the UAV is being applied for determining landscapes and features of land in a remote area, the certain percentile value may be set to a lower value.

In some examples, the confidence values and/or the terrain clearance values may be based on UAV activity. The confidence values may be decreased in an area with less (or no) UAV activity for a period of time, and the terrain clearance values may be increased in this area to reflect less confidence in the accuracy of the DSM. For example, a UAV may have not navigated through area 632 for a period of time. Therefore, the confidence values may have decreased compared to previously (e.g., as displayed by terrain model 600).

In some examples, the confidence values and/or the terrain clearance values may be based on the accuracy of the sensor data. If the area lacks accurate sensor data (e.g., the only sensor data collected for the area was during a snowstorm), then the confidence value of the altitude of the environmental surface at the grid cell may be decreased, and the terrain clearance value at the grid cell may be increased to reflect the lack of confidence in (and the lack of accuracy of) the sensor data.

In some examples, the confidence values and/or terrain clearance values may be based simply on having sensor data. For example, if sensor data is collected for an area, then the confidence values of the area may increase due to new sensor data having been collected. And the terrain clearance values may decrease following the increase in confidence values.

In some examples, the confidence values and/or the terrain clearance values may be updated periodically based on the level of UAV activity. If there is higher UAV activity in an area, then the confidence values and terrain clearance values for that area may be updated more often than an area with less UAV activity.

In some examples, the terrain clearance values may be based on regulatory heights associated with objects (or potential objects) located at the one or more grid cells. For example, an area may potentially have power lines, which may be regulated to be at least 15.5 feet. Therefore, the terrain clearance values at that area may be determined to result in the total altitude (e.g., altitude plus the terrain clearance value) to be above 15.5 feet.

In some examples, the dimensions of the grid cells may be based on sizes of objects located in the area. For example, if the area is a large metropolitan area populated by many buildings, a relatively smaller grid cell size may be used compared to an area that is less populated (e.g., a field of grass), because the large metropolitan area with many buildings may have more altitude variations.

In some examples, some grid cells in an area may have lower confidence values and/or higher terrain clearance values than other areas, and a UAV (or other computing device) may determine routes according to which areas have lower confidence values and/or higher terrain clearance values so as to increase confidence in an area as a whole. For example, in terrain model 620 of environment 500, areas 622, 624, 626, 628, 630, and 634 may have higher confidence values and/or lower terrain clearance values than area 632. Based on these differences, a UAV (or other computing device) may determine a route to navigate though area 632 to increase confidence that terrain model 620 accurately represents environment 500.

Similarly, a UAV may determine routes according to which areas have higher confidence values and/or lower terrain clearance values so as to avoid areas of which it is uncertain. For example, a UAV may be tasked with reliably dropping packages at a certain location. In the interest of reliability, the UAV may intentionally avoid areas with lower confidence values and higher terrain clearance values.

The examples described herein may involve one UAV, but it may be understood that such methods may be performed with more than one UAV. For example, a system may include one or more (or a plurality of) UAVs, and the UAVs may each send data to a central server, which may aggregate the sensor data to determine when and to what values to update the confidence values, the terrain clearance values, and the grid cell sizes. Similarly, some examples described herein may involve multiple UAVs, but it may be understood that such methods may be performed with only one UAV.

This process of collecting sensor data and adjusting confidence values, terrain clearance values, and/or grid cell sizes may be repeated. For example, after having determined terrain model 620, the UAV may collect additional sensor data, and adjust the altitudes in the DSM according to the sensor data into terrain model 640. With the additional sensor data, the UAV may also increase certain confidence values, decrease certain terrain clearance values, and decrease grid cell size as shown in terrain model 640. A UAV using terrain model 640 may determine to navigate through route 642, which may be generally lower in elevation than previous routes, e.g., routes 602 and 636.

As shown in FIG. 6, as more sensor data is collected and with increasing confidence values and lower terrain clearance values, the amount of available airspace increases and the UAV is able to go closer to objects in the environment. In the long run, this may facilitate faster service and more efficient energy usage, as the UAV no longer has to reach high elevations, while increasing reliability that the UAV will not collide with objects in the environment.

Figure 7:
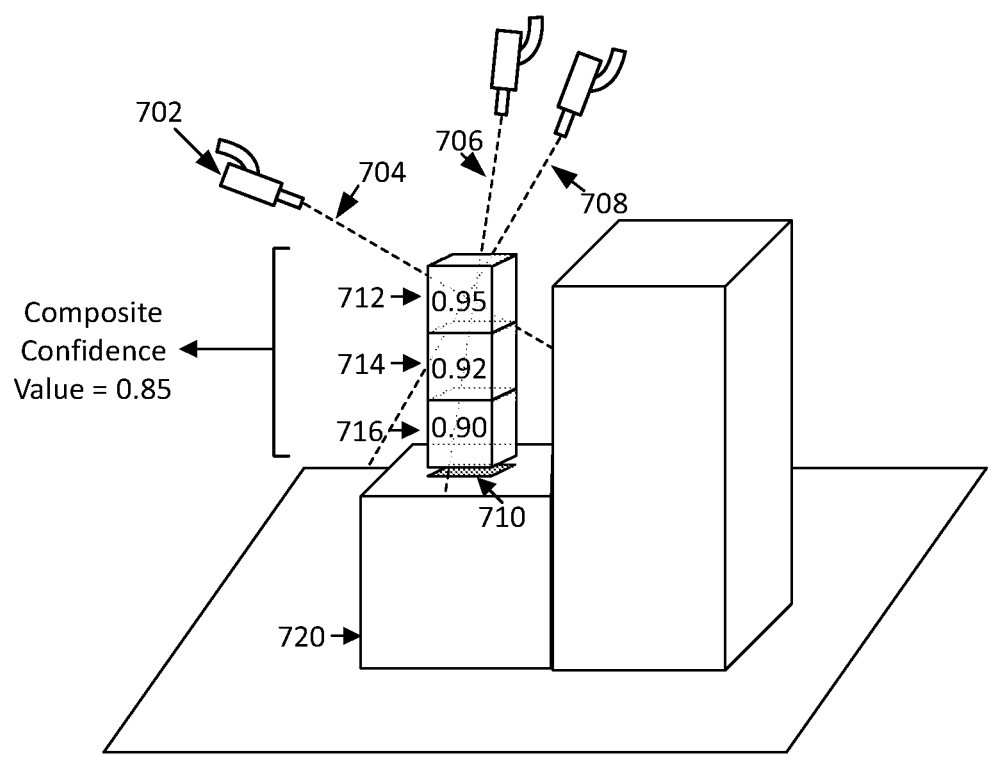
FIG. 7 illustrates an example determination of confidence values, in accordance with example embodiments.

FIG. 7 illustrates an example determination of confidence values, in accordance with example embodiments. In some examples, confidence values may be determined from a plurality of confidence values of a vertical stack of three-dimensional grid cells above the grid cell. The confidence values of the vertical stack of three-dimensional grid cells may be determined through sensor data associated with the vertical stack of three-dimensional cells at the grid cell.

For example, FIG. 7 depicts UAV 702, which may have observed and collected data representing areas above grid cell 710 from various angles, including areas indicated by rays 704, 706, and 708. The confidence values of the vertical stack of grid cells at grid cell 710 may thus be determined by the number of observations through the three-dimensional grid cells. For example, the area indicated by three-dimensional grid cell 712 may have been observed to be empty three times, by each of rays 704, 706, and 708, and thus have a high confidence value of 0.95. In contrast, the area indicated by three-dimensional grid cell 714 may have only been observed to be empty a couple of times, by rays 706 and 708, and thus have a comparatively lower confidence value of 0.92. The area indicated by three-dimensional grid cell 716 may have only been observed to be empty once, by ray 706, and may thus have an even lower confidence value of 0.90.

These confidence values of a three-dimensional grid cell above grid cell 710 may be aggregated into a single composite confidence value of 0.85 to reflect the confidence in the altitude of object 720 at grid cell 710.

In some examples, the areas indicated by rays 704, 706, and 708 may have been observed by separate UAVs. The sensor data from these separate UAVs may be sent to a server device where the observations may be combined and the composite confidence value may be determined. As mentioned above, a terrain clearance value of a certain grid cell may be based on the confidence value at the certain grid cell. Thus, the server device may also determine a terrain clearance value for the grid cell based on the composite confidence value.

In some examples, sensor data may be collected from multiple sources and compiled to be used to determine confidence values and terrain clearance values. Compiling sensor data from various sources and various angles may allow for a more accurate representation of the environment because a certain sensor may detect features (e.g., man-made obstacles, naturally occurring objects, etc.) in the environment that other sensors miss. The various sensor data may be collected by one or more additional UAVs in the airspace, an operator on the ground, robotic devices on the ground, satellite images, security cameras, and/or other sensors.

In further examples, objects in the environment may be more easily detectable from various angles. For example, a first ray may not identify an object (e.g., a thin wire, such as a telephone or electrical cable). A second ray may be used to supplement the first ray by capturing an image from above or below the image. For example, an image may be taken from a vehicle, a person holding a camera, a second UAV, etc. A UAV making decisions (e.g., route planning) based on a compilation of these sources of sensor data may have the benefit of making decisions while having more perspective on the environment and objects in the environment.

Figure 8A:
FIG. 8A illustrates sensor data collected from the ground, in accordance with example embodiments.

For example, FIGS. 8A, 8B, 8C, and 8D depict various sensor data that may be compiled for a more accurate depiction of an environment. FIG. 8A illustrates sensor data 800 collected from a camera at ground level, in accordance with example embodiments. Sensor data 800 may be a street level view of the environment, and include objects such as wires 802.

Figure 8B:
FIG. 8B illustrates additional sensor data, in accordance with example embodiments.

FIG. 8B illustrates additional sensor data 820, in accordance with example embodiments. Additional sensor data 820 may be a satellite view of the environment. Sensor data 820 may differ from sensor data 800 in that wires 802 are no longer as visible, and are instead detected as shadow wires 822. Shadow wires 822 of sensor data 820 may be more difficult to observe than wires 802 of sensor data 800.

Figure 8C:
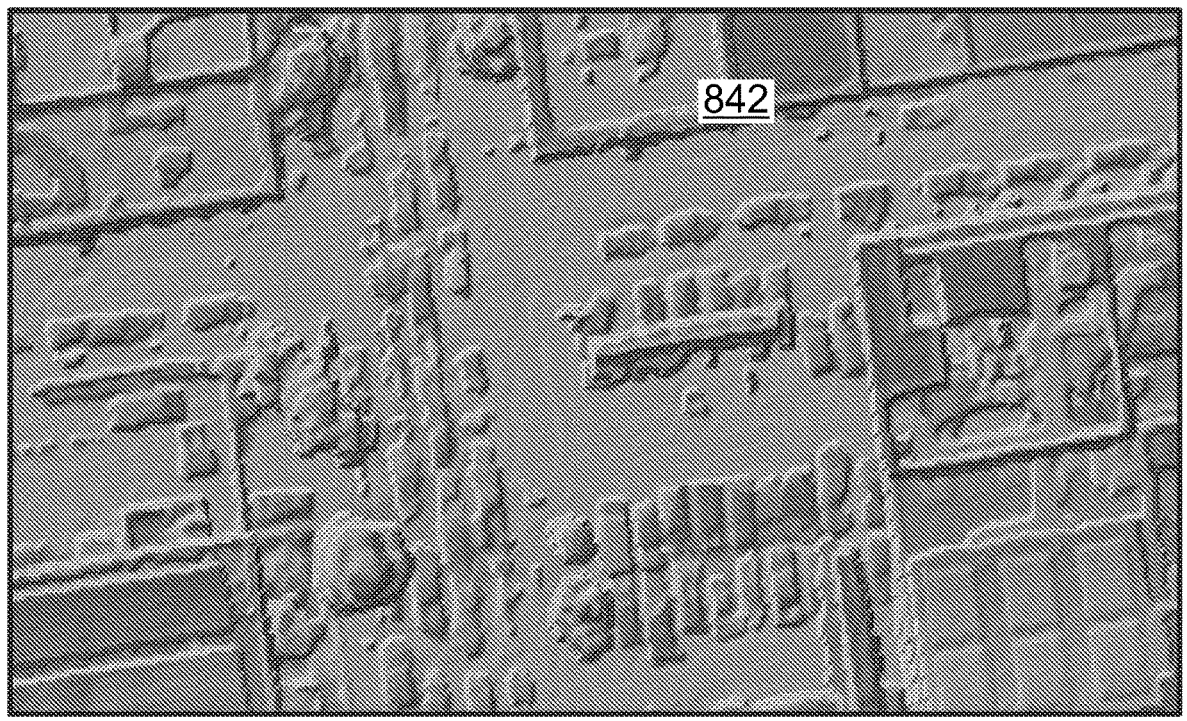
FIG. 8C illustrates sensor data collected by a UAV, in accordance with example embodiments.

FIG. 8C illustrates sensor data 840 collected by a UAV, in accordance with example embodiments. The UAV may collect sensor data 840 using one or more sensors on the UAV as the UAV is navigating in the environment. Additional sensor data 840 may differ from sensor data 800 and sensor data 820 as additional sensor data 840 does not include any indication of wires, as indicated by label 842.

Figure 8D:
FIG. 8D illustrates a compilation of sensor data, in accordance with example embodiments.

FIG. 8D illustrates compiled sensor data 860, in accordance with example embodiments. As displayed, sensor data 860 may be a compilation of sensor data 800, 820, and 840, and include features from each source of sensor data such that sensor data 860 would likely present the most accurate representation of the environment. For example, sensor data 860 may include wires 862 which may be not included at all or barely included in sensor data 820 and/or sensor data 840. Sensor data 860 may include information from sensor data 820 and 840 to accurately locate other features of the environment relative to the UAV. Together, sensor data 860 as a compilation of sensor data 800, 820, and 840 may thus present the most useful and accurate representation of the environment.

In some examples, when more sensors detect an object, a higher confidence value (and lower terrain clearance threshold) may be used. For example, in FIGS. 8A-8C, wires may be visible in two of the three sensor data samples. If wires were instead only visible in one of the three sensor data samples, then the confidence value may be set lower and the terrain clearance threshold may be set higher. Alternatively, if wires were present in all of the sensor data samples, then the confidence value may be set higher and the terrain clearance threshold may be set lower. And perhaps if additional samples were collected and these samples included wires, then the confidence value may further increase and the terrain clearance threshold may further decrease.

These different sets of sensor data may be gathered from various sources. For example, various sources of sensor data may be aggregated in a central database and the UAV or a planner may pull from the database each time it navigates to an area and/or updates the confidence values and/or the terrain confidence values for that area. In some examples, the various sources of sensor data may be stored in various servers and the UAV or a planner may pull sensor data from each database. In further examples, various sources of sensor data may also be sent by a planner to the UAV. In some examples, the UAV may only use sensor data collected within a threshold time frame of when it is operating.

In some examples, a computing device may determine a route for a UAV based on confidence values for areas of an environment. For example, the computing device may determine that one or more areas of the environment include low confidence values, and the computing device may determine a route such that the UAV navigates through each of the one or more areas with low confidence values. Additionally and/or alternatively, the computing device may optimize a total cost function for UAV route planning to balance leveraging existing world state information with exploring new areas. In some examples, the total cost function may include an exploration benefit component that is based on confidence values for different areas. As such, a path planning solution to an optimization problem may direct UAVs along a path in order to determine confidence values for areas for which no confidence values have been determined and/or to increase confidence values for areas that are less frequently traveled and/or not recently traveled. Accordingly, the computing device may take advantage of a feedback loop where low terrain confidence values at certain regions may cause a UAV to conduct more missions flying over such regions, which in turn may drive an increase in terrain confidence values at those regions.

In further examples, a computing device may determine a semantic understanding of the environment, and the computing device may determine confidence values for areas in the environment based on this semantic understanding. The computing device may collect data representative of the environment using various sensors on a UAV and based on this data, the computing device may determine semantic classifications for areas in the environment. For example, a UAV may capture images of the environment and a computing device may use this captured image data to segment and classify areas within the image data. Additionally and/or alternatively, a computing device may determine a point cloud representing surfaces in the environment and classify areas of the point cloud. For a given grid cell, the computing device may determine a semantic classification of a surface at the given grid cell and determine the confidence value at the grid cell accordingly. For example, the computing device may determine that a river is in the environment at the location represented by a given cell. Because the height of a river is unlikely to vary significantly, the computing device may determine a higher confidence value for that grid cell. As another example, if the computing device determines that a building is in the environment at the location represented by a grid cell, the computing device may determine a lower confidence value for that grid cell because buildings may include different features making their heights more difficult to confidently determine.

Figure 9:
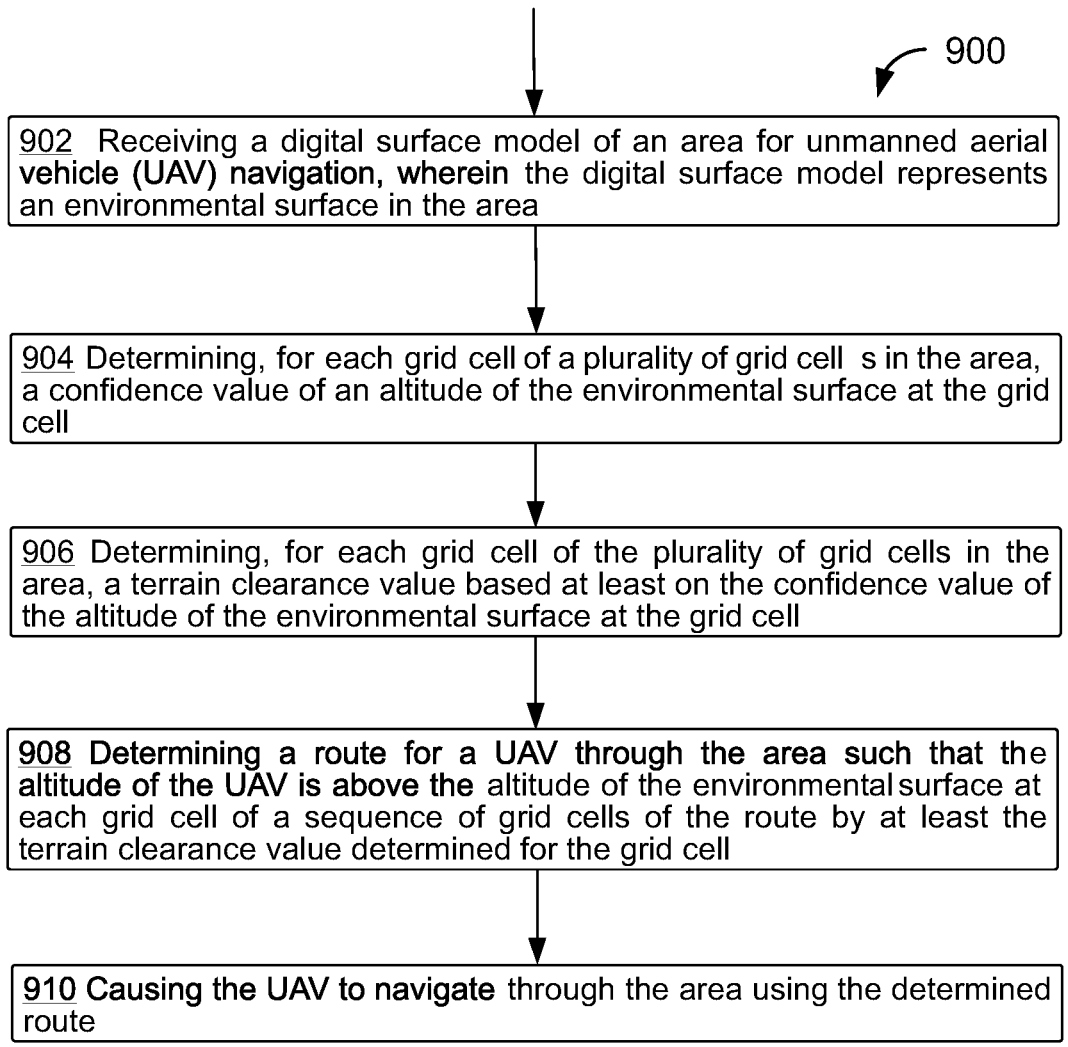
FIG. 9 is a block diagram of a method, in accordance with example embodiments.

FIG. 9 illustrates a block diagram of a method, in accordance with example embodiments. In particular, FIG. 9 shows a method 900. Method 900 may be carried out by a UAV, a server device, or other computing devices.

In addition, for the method shown in FIG. 8 and other processes and methods disclosed herein, the flowchart shows functionality and operation of one possible implementation of present embodiments. In this regard, each blocks may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 8 may represent circuitry that is wired to perform the specific logical functions in the process.

At block 902, method 900 includes receiving a digital surface model of an area for unmanned aerial vehicle (UAV) navigation, wherein the digital surface model represents an environmental surface in the area. As mentioned above, a DSM may be used as an occupancy grid for flight planning purposes to ensure that a path of a UAV maintains vertical and horizontal clearance from the terrain and objects in the world.

At block 904, method 900 includes determining, for each grid cell of a plurality of grid cells in the area, a confidence value of an altitude of the environmental surface at the grid cell.

At block 906, method 900 includes determining, for each grid cell of the plurality of grid cells in the area, a terrain clearance value based at least on the confidence value of the altitude of the environmental surface at the grid cell.

At block 908, method 900 includes determining a route for a UAV through the area such that the altitude of the UAV is above the altitude of the environmental surface at each grid cell of a sequence of grid cells of the route by at least the terrain clearance value determined for the grid cell.

At block 910, method 900 includes causing the UAV to navigate through the area using the determined route.

In some examples, determining the confidence value for each grid cell comprises initially setting the confidence value to a default low confidence value, where determining the terrain clearance value for each grid cell comprises initially setting the terrain clearance value to a default high terrain clearance value based at least on the default low confidence value for the grid cell.

In some examples, each grid cell of the plurality of grid cells in the area is associated with a last updated timestamp, where determining the confidence value for each grid cell is based on the last updated timestamp of the grid cell.

In some examples, determining the confidence value for each grid cell based on the last updated timestamp of the grid cell comprises determining the confidence value such that a grid cell having an earlier timestamp has a lower confidence value and a higher terrain clearance value than a grid cell having a later timestamp.

In some examples, determining the confidence value for each grid cell comprises receiving sensor data associated with the altitude of the environmental surface at the grid cell, determining, based on the sensor data associated with the altitude of the surface environment at the grid cell, a frequency count indicative of how many samples were collected for the grid cell, and determining, based on the frequency count, the confidence value at the grid cell.

In some examples, determining the confidence value for each grid cell comprises receiving sensor data associated with a vertical stack of three-dimensional cells at the grid cell, determining, based on the sensor data associated with the vertical stack of three-dimensional cells at the grid cell, a plurality of frequency counts indicative of how many sensor rays passed through each of the vertical stack of three-dimensional cells at the grid cell, and determining, based on the plurality of frequency counts, the confidence value for the grid cell.

In some examples, determining the confidence value for each grid cell comprises receiving sensor data associated with a vertical stack of three-dimensional cells at the grid cell, determining, based on the sensor data associated with the vertical stack of three-dimensional cells at the grid cell, a plurality of confidence values, each of the plurality of confidence values indicative of confidence in a presence of an object at a three-dimensional grid cell of the vertical stack of three-dimensional grid cells, and determining, based on the plurality of confidence values, the confidence value for the grid cell.

In some examples, method 900 further comprises determining, based on a determined location of the UAV, a location confidence value of the determined location of the UAV, wherein determining the terrain clearance value for grid cell is also based on the determined location confidence value of the UAV.

In some examples, determining the terrain clearance value for each grid cell comprises determining a statistical distribution of a probability that an environmental altitude at the grid cell is below the terrain clearance value, and determining, based on the statistical distribution, the terrain clearance value associated with a certain percentile value of the statistical distribution.

In some examples, determining the terrain clearance value for each grid cell further comprises determining, based on an application of the UAV, the certain percentile value.

In some examples, the statistical distribution is a cumulative distribution function.

In some examples, method 900 further comprises determining one or more grid cells of the plurality of grid cells in a region lacking UAV activity for a period of time, decreasing, for each grid cell of the one or more grid cells, the confidence value of the altitude of the environmental surface at the grid cell, and increasing, for each grid cell of the one or more grid cells, the terrain clearance value at the grid cell.

In some examples, method 900 further comprises determining one or more grid cells of the plurality of grid cells in a region lacking consistent sensor data, decreasing, for each grid cell of the one or more grid cells, the confidence value of the altitude of the environmental surface at the grid cell, and increasing, for each grid cell of the one or more grid cells, the terrain clearance value at the grid cell.

In some examples, method 900 further comprises receiving sensor data associated with the environmental surface, determining, based on the sensor data associated with the environmental surface, one or more grid cells included in the sensor data associated with the environmental surface, increasing, for each grid cell of the one or more grid cells, the confidence value of the altitude of the environmental surface at the grid cell, and decreasing, for each grid cell of the one or more grid cells, the terrain clearance value at the grid cell.

In some examples, method 900 further comprises decreasing grid cell size for the one or more grid cells included in the sensor data associated with the environmental surface.

In some examples, method 900 further comprises determining a UAV frequency corresponding to a frequency of UAVs navigating through the area, based on the UAV frequency, determining an update frequency for the confidence values of the plurality of grid cells in the area and for the terrain clearance values of the plurality of grid cells, and based on the update frequency, determining and updating the confidence values and the terrain clearance values of each grid cell of the plurality of grid cells.

In some examples, determining the terrain clearance value for one or more grid cells is further based on regulatory heights associated with objects located at the one or more grid cells.

In some examples, method 900 further comprises determining the plurality of grid cells in the area, wherein dimensions for the plurality of grid cells are based on sizes of objects located in the area.

In some examples, method 900 further comprises determining a subset of grid cells from the plurality of grid cells in the area, wherein each grid cell of the subset of grid cells is associated with a low confidence value and a high terrain clearance value at the grid cell, based on the determined subset of grid cells from the plurality of grid cells, determining a plurality of routes for one or more UAVs to increase UAV activity proximate to the subset of grid cells, and transmitting, to the one or more UAVs, the plurality of routes.

In some examples, a computing device and/or a UAV may be configured to perform the steps described above. In some embodiments, a system may include a processor and a non-transitory computer-readable medium having stored thereon instructions that, when executed by the processor, cause the processor to perform operations in accordance with any of methods described above and/or below. And in some embodiments, a non-transitory computer-readable medium having stored thereon instructions that, when executed by a computing device, may cause the computing device to perform operations in accordance with any of the methods described above and/or below.

For example, a computing device may be configured to receive a digital surface model of an area for an unmanned aerial vehicle (UAV) navigation, wherein the digital surface model represents an environmental surface in the area. The computing device may also be configured to determine, for each grid cell of a plurality of grid cells in the area, a confidence value of an altitude of the environmental surface at the grid cell. The computing device may be further configured to determine, for each grid cell of the plurality of grid cells in the area, a terrain clearance value based at least on the confidence value of the altitude of the environmental surface at the grid cell. The computing device may additionally be configured to determine a route for a UAV through the area such that the altitude of the UAV is above the altitude of the environmental surface at each grid cell of a sequence of grid cells of the route by at least the terrain clearance value determined for the grid cell. The computing device may also be configured to transmit, by the computing device to the UAV, the route for the UAV.

The computing device may be further configured to determine a subset of grid cells from the plurality of grid cells in the area, wherein each grid cell of the subset of grid cells is associated with a low confidence value and a high terrain clearance value at the grid cell, based on the determined subset of grid cells from the plurality of grid cells, determine a plurality of routes for one or more UAVs to increase UAV activity proximate to the subset of grid cell, and transmit, to the one or more UAVs, the plurality of routes.

In some examples, a UAV may be configured to receive a digital surface model of an area for unmanned aerial vehicle (UAV) navigation, wherein the digital surface model represents an environmental surface in the area. The UAV may be further configured to determine, for each grid cell of a plurality of grid cells in the area, a confidence value of an altitude of the environmental surface at the grid cell. The UAV may also be configured to determine, for each grid cell of the plurality of grid cells in the area, a terrain clearance value based at least on the confidence value of the altitude of the environmental surface at the grid cell. The UAV may additionally be configured to determine a route for the UAV through the area such that the altitude of the UAV is above the altitude of the environmental surface at each grid cell of a sequence of grid cells of the route by at least the terrain clearance value determined for the grid cell. The UAV may also be configured to navigate through the area using the determined route.

IV. EXAMPLE IMPLEMENTATIONS

A DSM refers to an elevation model (e.g., a 2.5D representation of the world) that captures both the environment's natural and artificial features. Digital Surface Models (DSMs) may be used as an occupancy grid for flight planning purposes to ensure that a path of an unmanned aerial vehicle (UAV) maintains vertical and horizontal clearance from the terrain and objects in the world. DSMs may be derived from aerial imagery and processed into a raster image that becomes the world model. The DSM may then be augmented by a manually surveyed data layer that may include objects not included in the DSM either due to resolution or freshness of data (e.g., a power line may not be included in a DSM when the resolution of captured aerial imagery is too low to identify the power line). A planner (e.g., a software program that generates flight paths for one or more UAVs) may generate paths to maintain vertical and horizontal separation from objects in the DSM.

As referred to herein, a terrain analysis pipeline (TAP) refers to a chain of software processing components arranged to update a DSM based on multiple sources of data. As part of the TAP, a DSM may be updated periodically for several nests of UAVs. These updated DSMs may be output by the TAP as composite layers which combine both the TAP DSM and the baseline DSM. The baseline DSM refers to a digital surface model obtained from a third party (e.g., Google Maps). The TAP DSM refers to a digital surface model built using 3D reconstructions generated by the TAP. A terrain composite layer refers to a terrain layer used by the planner to check the feasibility of planned flights.

In addition to the composite layer, a TAP generate-DSM pipeline may output a buffer layer. The buffer layer may be a raster layer, and each pixel of this layer may be set to have a value of a TAP terrain buffer or marked as an unset terrain pixel. An unset terrain pixel refers to a pixel lacking sufficient TAP data to set a value. Additionally, and outside of the TAP generate-DSM pipeline, a default terrain buffer layer may be generated and maintained. The default terrain buffer layer may consist of non-overlapping polygons that define the baseline terrain buffer value that applies to each area.

Moreover, a terrain override layer may also be generated and maintained outside of the TAP generate-DSM pipeline. The terrain override layer may be a vector layer consisting of polygons within which the terrain clearance value should be set to a specific value, ignoring any values within that polygon from both the TAP terrain buffer layer and the default terrain buffer layer.

A post-processing system may consume the TAP terrain buffer layer (represented as a raster layer), the terrain overrides layer (represented as a layer of vectors), and the default terrain buffer layers (represented as a layer of vectors) to produce a planner minimum height above ground level (AGL) layer. The planner minimum AGL layer may be a single vector layer of non-overlapping polygons that defines the minimum AGL for each flight area. For each pixel under consideration, the output planner minimum AGL layer may include the default terrain buffer (if there is no other overlapping datum), terrain overrides layer value (if present), and the TAP terrain buffer value (if present).

When calculating the terrain clearance (min AGL) value that may be used for a given flight volume, the planner may use the following steps: (1) read overlapping polygons from the planner minimum AGL layer as defined above; (2) if the retrieved area from the planner minimum AGL area is of smaller area than the flight volume, (e.g., there may be missing data from planner minimum AGL), then the flight volume may be considered unfeasible; (3) otherwise, the minimum AGL used for each flight volume may be set to be the largest value of all polygons retrieved in the prior step.

As mentioned above, the TAP terrain buffer layer may be a terrain raster layer. The TAP terrain buffer layer may be generated by applying a threshold to the confidence value stored in a TAP distribution layer. The TAP terrain buffer layer may be associated with a date string and perhaps location. TAP terrain buffer layers generated from the same run may share the same date string.

The confidence value may be updated for every valid pixel in the TAP DSM for every run even if no TAP data is present for that pixel in the run. The confidence value may be updated for all valid pixels in the distribution layer, which includes all the pixels for which the data was collected from at least one reconstruction both in the past as well as in the current run.

The threshold to be used on the confidence value to decide whether to set the TAP terrain buffer value for that pixel to be a valid number may be determined by looking at the confidence values from some example runs.

If the TAP terrain buffer layer is a terrain raiser with a minimum and a maximum value (e.g., a layer with a single plane of type raster of type float 32) such that it can be visualized in a geostore viewer, then both floats of a given pixel may have the same value and the planner may be checked to ignore any pixels that have different minimum and/or maximum values.

The baseline terrain buffer may reflect knowledge of what is missing in the baseline DSM. For example, the difference between a baseline DSM and the TAP DSM for all places where a TAP DSM is available may be calculated. The cumulative distribution function (CDF) of this difference may then be calculated, and the baseline terrain buffer may be set to be equal to the 99.99th percentile value of that CDF. In practice, the percentile value may be selected to be large enough to give good confidence (according to the CDF) and small enough to have some airspace available for flights. Whether the confidence value is satisfactory for safe operations may be evaluated.

Moreover, the baseline terrain buffer layer value may be specified on a per shard basis (e.g., it may be added to a shards table in a database). This means that the baseline terrain buffer may be set on a per metro area basis if required (e.g., due to regulatory requirements/reasons).

Finding a reasonable value for the TAP terrain buffer may be difficult if there is no accurate/fresh DSM for comparison to the TAP data. Using manually surveyed obstacle data for this may not work well because manual surveys may overestimate the obstacle height. One method may involve comparing the TAP data to aerial imagery data to get an understanding of the types of objects that the TAP may miss.

Regarding testing and validation, there are a few tests that may be run, including the following: (1) verifying that all pixels in the TAP terrain buffer layer that change from unset to a valid value are contained within the coverage polygons; and (2) verifying that all pixels that are unset in the observed DSM are unset in the TAP terrain buffer layer.

To deal with existing nests that have obstacle coverage but no DSM coverage, a few approaches may be taken. For example, a manual obstacle survey may be performed before the UAV starts to fly in certain areas. In further examples, a minimum AGL value of 30 m or a different default height may be used for these certain areas because of the existence of obstacle surveys.

The terrain clearance used for flights from these nests may also change in the following ways: (1) for areas where there is coverage, the terrain clearance may change from 30 m or a different default height to the value of TAP terrain buffer (which may be at least as high as 30 m, but may be lower); and (2) for areas where there is no coverage, terrain clearance may change from being 30 m or a different default height to the value of baseline terrain buffer (which is highly likely to be much greater than 30 m).

Assuming that the TAP terrain buffer is set correctly, such an approach for areas where there is coverage should not be a concern. However, such an approach for areas where there is no coverage may cause a reduction in available airspace to fly for areas where an obstacle survey has been done but where there is no coverage.

Total flyable area for areas where there is no coverage may be small for all nests for which TAP DSM updates are either currently enabled or can be enabled. Moreover, since the obstacle surveys may be antiquated by a year or more, it may be reasonable to increase the terrain clearance for those areas from 30 m or a different default height to the value of baseline terrain buffer until coverage is obtained for those areas.

For nests where TAP DSM updates may not be enabled, the baseline terrain buffer value may be set to 30 m or a different default height. This value may be set on a per shard basis, such that a shard is equivalent to a metro area. This may result in no change in the terrain clearance value for those nests before/after the implementation of the methodology described herein.

Some alternatives to the above-described approaches are as follows. As part of the generate-DSM pipeline, TAP may output a new high-confidence composite (raster) layer. This may facilitate differentiating between the composite layer that TAP currently generates and the new high-confidence composite layer proposed herein. Legacy TAP composite layer may be used herein to refer to the former.

The minimum value of the high-confidence composite layer may be the same as the minimum value of the legacy TAP composite layer. For pixels where sufficient data is available, the maximum value of the high-confidence layer may be equal to the maximum value of the legacy layer plus the value of TAP terrain buffer. The TAP terrain buffer here may be used to account for things that TAP may not see (e.g., power lines). For pixels where sufficient data is not available (and therefore only have the baseline DSM to infer terrain), the high-confidence layer max value may be equal to the legacy layer max value plus the value of the baseline terrain buffer. In this case, the legacy TAP composite layer maximum value may be either the baseline DSM or the baseline digital terrain model (DTM), whichever is greater.

One problem with the above approach may be that it does not address the terrain clearance override requirement, because the above-detailed approach may tightly integrate the terrain clearance values with the DSM generation process. To address this, the above-described approach may be modified such that the generate-DSM pipeline continues to output the legacy TAP composite layer. However, instead of a high-confidence composite layer, it may output a terrain buffer (raster) layer. Pixels in the terrain buffer layer may be of binary value, and indicate the buffer value that would have been added to the legacy composite layer to create the high-confidence composite layer (this may be one of two values: the baseline terrain buffer value or the TAP terrain buffer value). The high-confidence composite layer itself may not need to be output anymore, because the planner may derive the high-confidence composite layer by adding the legacy TAP composite layer to the terrain buffer layer.

This way, the terrain clearance overrides requirement may be addressed by configuring the planner to read in a terrain override layer and applying the overrides specified on that layer to the terrain buffer layer before applying the terrain buffer to the composite layer. Overrides layer may consist of polygons that have the absolute terrain clearance that needs to be applied on the legacy composite layer (not a delta that needs to be applied to the terrain buffer layer). Within these polygons, the values of the terrain buffer layer may be ignored by the planner.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving a digital surface model of an area for an unmanned aerial vehicle (UAV) to navigate, wherein the digital surface model represents an environmental surface in the area;
   determining, for each grid cell of a plurality of grid cells in the area, a confidence value indicating confidence in an altitude of the environmental surface as depicted by the digital surface model at the grid cell, wherein the confidence value is based on sensor data previously collected by one or more UAVs other than the UAV;
   determining, for each grid cell of the plurality of grid cells in the area, a terrain clearance value based at least on the confidence value of the altitude of the environmental surface at the grid cell, wherein a higher value of the confidence value of the altitude of the environmental surface at the grid cell leads to a lower value of the terrain clearance value and more available airspace for the UAV at the grid cell, and wherein a lower value of the confidence value of the altitude of the environmental surface at the grid cell leads to a higher value of the terrain clearance value and less available airspace at the grid cell;
   determining a route for the UAV through the area such that, at each grid cell of a sequence of grid cells of the route, the altitude of the UAV at the grid cell is above the altitude of the environmental surface by at least the terrain clearance value determined for the grid cell; and
   autonomously navigating, by the UAV, through the area using the determined route.

2. The method of claim 1, wherein determining the confidence value for each grid cell comprises initially setting the confidence value to a default low confidence value, wherein determining the terrain clearance value for each grid cell comprises initially setting the terrain clearance value to a default high terrain clearance value based at least on the default low confidence value for the grid cell.

3. The method of claim 1, wherein each grid cell of the plurality of grid cells in the area is associated with a last updated timestamp, wherein determining the confidence value for each grid cell is based on the last updated timestamp of the grid cell.

4. The method of claim 3, wherein determining the confidence value for each grid cell based on the last updated timestamp of the grid cell comprises determining the confidence value such that a grid cell having an earlier timestamp has a lower confidence value and a higher terrain clearance value than a grid cell having a later timestamp.

5. The method of claim 1, wherein determining the confidence value for each grid cell comprises:
   receiving sensor data associated with the altitude of the environmental surface at the grid cell;
   determining, based on the sensor data associated with the altitude of the surface environment at the grid cell, a frequency count indicative of how many samples were collected for the grid cell; and
   determining, based on the frequency count, the confidence value at the grid cell.

6. The method of claim 1, wherein determining the confidence value for each grid cell comprises:
   receiving sensor data associated with a vertical stack of three-dimensional cells at the grid cell;
   determining, based on the sensor data associated with the vertical stack of three-dimensional cells at the grid cell, a plurality of frequency counts indicative of how many sensor rays passed through each of the vertical stack of three-dimensional cells at the grid cell; and determining, based on the plurality of frequency counts, the confidence value for the grid cell.

7. The method of claim 1, wherein determining the confidence value for each grid cell comprises:
receiving sensor data associated with a vertical stack of three-dimensional cells at the grid cell;
determining, based on the sensor data associated with the vertical stack of three-dimensional cells at the grid cell, a plurality of confidence values, each of the plurality of confidence values indicative of confidence in a presence of an object at a three-dimensional grid cell of the vertical stack of three-dimensional grid cells; and
determining, based on the plurality of confidence values, the confidence value for the grid cell.

8. The method of claim 1, wherein the method further comprises:
determining, based on a determined location of the UAV, a location confidence value of the determined location of the UAV, wherein determining the terrain clearance value for grid cell is also based on the determined location confidence value of the UAV.

9. The method of claim 1, wherein determining the terrain clearance value for each grid cell comprises:
determining a statistical distribution of a probability that an environmental altitude at the grid cell is below the terrain clearance value; and
determining, based on the statistical distribution, the terrain clearance value associated with a certain percentile value of the statistical distribution.

10. The method of claim 9, wherein determining the terrain clearance value for each grid cell further comprises:
determining, based on an application of the UAV, the certain percentile value.

11. The method of claim 9, wherein the statistical distribution is a cumulative distribution function.

12. The method of claim 1, further comprising:
determining one or more grid cells of the plurality of grid cells in a region lacking UAV activity for a period of time;
decreasing, for each grid cell of the one or more grid cells, the confidence value of the altitude of the environmental surface at the grid cell; and
increasing, for each grid cell of the one or more grid cells, the terrain clearance value at the grid cell.

13. The method of claim 1, further comprising:
determining one or more grid cells of the plurality of grid cells in a region lacking consistent sensor data;
decreasing, for each grid cell of the one or more grid cells, the confidence value of the altitude of the environmental surface at the grid cell; and
increasing, for each grid cell of the one or more grid cells, the terrain clearance value at the grid cell.

14. The method of claim 1, further comprising:
receiving sensor data associated with the environmental surface;
determining, based on the sensor data associated with the environmental surface, one or more grid cells included in the sensor data associated with the environmental surface;
increasing, for each grid cell of the one or more grid cells, the confidence value of the altitude of the environmental surface at the grid cell; and
decreasing, for each grid cell of the one or more grid cells, the terrain clearance value at the grid cell.

15. The method of claim 14, further comprising:
decreasing grid cell size for the one or more grid cells included in the sensor data associated with the environmental surface.

16. The method of claim 1, further comprising:
determining a UAV frequency corresponding to a frequency of UAVs navigating through the area;
based on the UAV frequency, determining an update frequency for the confidence values of the plurality of grid cells in the area and for the terrain clearance values of the plurality of grid cells; and
based on the update frequency, determining and updating the confidence values and the terrain clearance values of each grid cell of the plurality of grid cells.

17. The method of claim 1, wherein determining the terrain clearance value for one or more grid cells is further based on regulatory heights associated with objects located at the one or more grid cells.

18. The method of claim 1, further comprising:
determining the plurality of grid cells in the area, wherein dimensions for the plurality of grid cells are based on sizes of objects located in the area.

19. The method of claim 1, wherein determining the route for the UAV through the area is based on minimizing a total cost value, wherein the total cost value includes an exploration benefit component based on the confidence values at each grid cell of the sequence of grid cells.

20. The method of claim 1, further comprising:
determining a semantic classification for the environmental surface at each grid cell of the plurality of grid cells in the area, wherein determining the confidence value of the altitude of the environmental surface at each grid cell of the plurality of grid cells in the area is based on the semantic classification of the grid cell.

21. A computing device configured to:
receive a digital surface model of an area for an unmanned aerial vehicle (UAV) to navigate, wherein the digital surface model represents an environmental surface in the area;
determine, for each grid cell of a plurality of grid cells in the area, a confidence value indicating confidence in an altitude of the environmental surface as depicted by the digital surface model at the grid cell, wherein the confidence value is based on sensor data previously collected by one or more UAVs other than the UAV;
determine, for each grid cell of the plurality of grid cells in the area, a terrain clearance value based at least on the confidence value of the altitude of the environmental surface at the grid cell, wherein a higher value of the confidence value of the altitude of the environmental surface at the grid cell leads to a lower value of the terrain clearance value and more available airspace for the UAV at the grid cell, and wherein a lower value of the confidence value of the altitude of the environmental surface at the grid cell leads to a higher value of the terrain clearance value and less available airspace at the grid cell;
determine a route for autonomous navigation of the UAV through the area such that, at each grid cell of a sequence of grid cells of the route, the altitude of the UAV at the grid cell is above the altitude of the environmental surface by at least the terrain clearance value determined for the grid cell; and
transmit, by the computing device to the UAV, the route for the UAV.

22. The computing device of claim 21, wherein the computing device is further configured to:

determine a subset of grid cells from the plurality of grid cells in the area, wherein each grid cell of the subset of grid cells is associated with a low confidence value and a high terrain clearance value at the grid cell;

based on the determined subset of grid cells from the plurality of grid cells, determine a plurality of routes for one or more UAVs to increase UAV activity proximate to the subset of grid cells; and transmit, to the one or more UAVs, the plurality of routes.

23. An unmanned aerial vehicle (UAV) configured to:

receive a digital surface model of an area for the unmanned aerial vehicle (UAV) to navigate, wherein the digital surface model represents an environmental surface in the area;

determine, for each grid cell of a plurality of grid cells in the area, a confidence value indicating confidence in an altitude of the environmental surface as depicted by the digital surface model at the grid cell, wherein the confidence value is based on sensor data previously collected by one or more UAVs other than the UAV;

determine, for each grid cell of the plurality of grid cells in the area, a terrain clearance value based at least on the confidence value of the altitude of the environmental surface at the grid cell, wherein a higher value of the confidence value of the altitude of the environmental surface at the grid cell leads to a lower value of the terrain clearance value and more available airspace for the UAV at the grid cell, and wherein a lower value of the confidence value of the altitude of the environmental surface at the grid cell leads to a higher value of the terrain clearance value and less available airspace at the grid cell;

determine a route for the UAV through the area such that such that, at each grid cell of a sequence of grid cells of the route, the altitude of the UAV at the grid cell is above the altitude of the environmental surface by at least the terrain clearance value determined for the grid cell; and autonomously navigate through the area using the determined route.

* * * * *